(12) United States Patent
Suhas et al.

(10) Patent No.: US 10,649,681 B2
(45) Date of Patent: May 12, 2020

(54) DYNAMIC GARBAGE COLLECTION P/E POLICIES FOR REDUNDANT STORAGE BLOCKS AND DISTRIBUTED SOFTWARE STACKS

(71) Applicant: Samsung Electronics Co., Ltd., Suwon-si, Gyeonggi-do (KR)

(72) Inventors: Suhas, San Jose, CA (US); Ashwini Batrahalli, San Jose, CA (US); Tameesh Suri, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 806 days.

(21) Appl. No.: 15/133,205

(22) Filed: Apr. 19, 2016

(65) Prior Publication Data

US 2017/0212708 A1 Jul. 27, 2017

Related U.S. Application Data

(60) Provisional application No. 62/286,926, filed on Jan. 25, 2016.

(51) Int. Cl.
*H04L 29/08* (2006.01)
*G06F 3/06* (2006.01)

(52) U.S. Cl.
CPC .......... *G06F 3/0652* (2013.01); *G06F 3/0608* (2013.01); *G06F 3/0679* (2013.01); *H04L 67/1097* (2013.01)

(58) Field of Classification Search
CPC ................... H04L 67/1097; G06F 3/0652
See application file for complete search history.

(56) References Cited

U.S. PATENT DOCUMENTS

| 8,572,311 | B1 | 10/2013 | Shalvi et al. | |
|---|---|---|---|---|
| 9,519,578 | B1 * | 12/2016 | Kuzmin | G06F 8/654 |
| 2011/0258362 | A1 | 10/2011 | McLaren et al. | |
| 2012/0030441 | A1 * | 2/2012 | Yamashita | G06F 11/141 711/162 |
| 2012/0151124 | A1 * | 6/2012 | Baek | G06F 12/0246 711/103 |
| 2013/0125116 | A1 * | 5/2013 | Liu | G06F 9/45558 718/1 |
| 2013/0185487 | A1 * | 7/2013 | Kim | G06F 3/0605 711/103 |
| 2014/0032817 | A1 * | 1/2014 | Bux | G06F 12/0246 711/103 |

(Continued)

*Primary Examiner* — Moustafa M Meky
*Assistant Examiner* — Sm Z Islam
(74) *Attorney, Agent, or Firm* — Renaissance IP Law Group LLP

(57) ABSTRACT

A Solid State Drive (SSD) (110) is disclosed. The SSD (110) may include storage (218) for data, and reception circuitry (203) to receive various instructions and data. The reception circuitry (203) may receive an instruction (257) from a host machine (105) to perform garbage collection, along with a selected P/E strategy (260). The SSD (110) may include garbage collection logic (209) to perform garbage collection, possibly with a delayed Program operation if an adaptive P/E strategy (1110) is selected. The SSD (110) may also include a mapping table (221) that may identify which pages were not Programmed before victim blocks (233, 236) were erased, and therefore require replication during a delayed Program operation.

9 Claims, 20 Drawing Sheets

(56) References Cited

U.S. PATENT DOCUMENTS

| | | | |
|---|---|---|---|
| 2014/0181370 A1* | 6/2014 | Cohen | G06F 12/0246 711/103 |
| 2014/0219020 A1* | 8/2014 | Kwak | G11C 16/10 365/185.03 |
| 2015/0169442 A1 | 6/2015 | Fisher et al. | |
| 2015/0220385 A1 | 8/2015 | Wood et al. | |
| 2015/0261674 A1* | 9/2015 | Wei | G06F 12/0866 711/135 |
| 2016/0124847 A1* | 5/2016 | Malwankar | G06F 12/0253 711/103 |

\* cited by examiner

DYNAMIC GARBAGE COLLECTION P/E POLICIES FOR REDUNDANT STORAGE BLOCKS AND DISTRIBUTED SOFTWARE STACKS

RELATED APPLICATION DATA

This application claims the benefit of U.S. Provisional Patent Application Ser. No. 62/286,926, filed Jan. 25, 2016, which is hereby incorporated by reference.

FIELD

This inventive concept relates to distributed storage systems, and more particularly to performing garbage collection on Solid State Drives (SSDs) in distributed storage systems.

BACKGROUND

Solid State Drives (SSDs) are rapidly replacing traditional hard disk drives in data centers. The cost per gigabyte of SSDs is slowly declining, and SSDs deliver an order of magnitude better latency and performance.

An SSD is a flash memory based data storage device. Data is stored in individual cells, which are organized into groups called a page. Pages in turn are organized into groups called blocks. The page is the smallest unit that may be read or written: reads and writes are aligned at the page size. Even if the request involves a smaller amount of data than a page, an entire page is read or written.

In SSDs, overwrites are not permitted. When existing data is changed, the page storing the data being changed is copied into an internal register within the SSD, updated, and then written to a free page. The old page is then marked as stale or invalid, indicating that the data stored thereon is no longer valid. Stale data may not be overwritten, and must be reclaimed (via erasure) to be marked as free. This recovery operation is called garbage collection.

But while read and write requests operate on pages, pages may not be erased individually. The erase unit size is usually a block.

A block might contain some valid pages and some invalid/stale pages. In that situation, before the block may be erased, the valid data must be copied to a free page in another block (called a Program operation). Then, after any valid data has been copied out of the block, the block may be erased. Garbage collection includes both this Program operation and the erase operation: this combination of operations is called the Program/Erase (P/E) cycle.

If write requests arrive during garbage collection, they are stalled until garbage collection completes. In this situation, the write request incurs an additional latency equal to the sum of the latency required for the P/E cycle (beyond the latency required for the write operation itself). For critical writes, this additional latency may prove to be very costly. In addition, in heavy write workloads, garbage collection will occur frequently, thus increasing the interference with read and write requests.

A need remains for a way to reduce the potential latency experienced by write requests due to the P/E cycle in SSDs in a distributed storage system.

DETAILED DESCRIPTION

Figure 1:
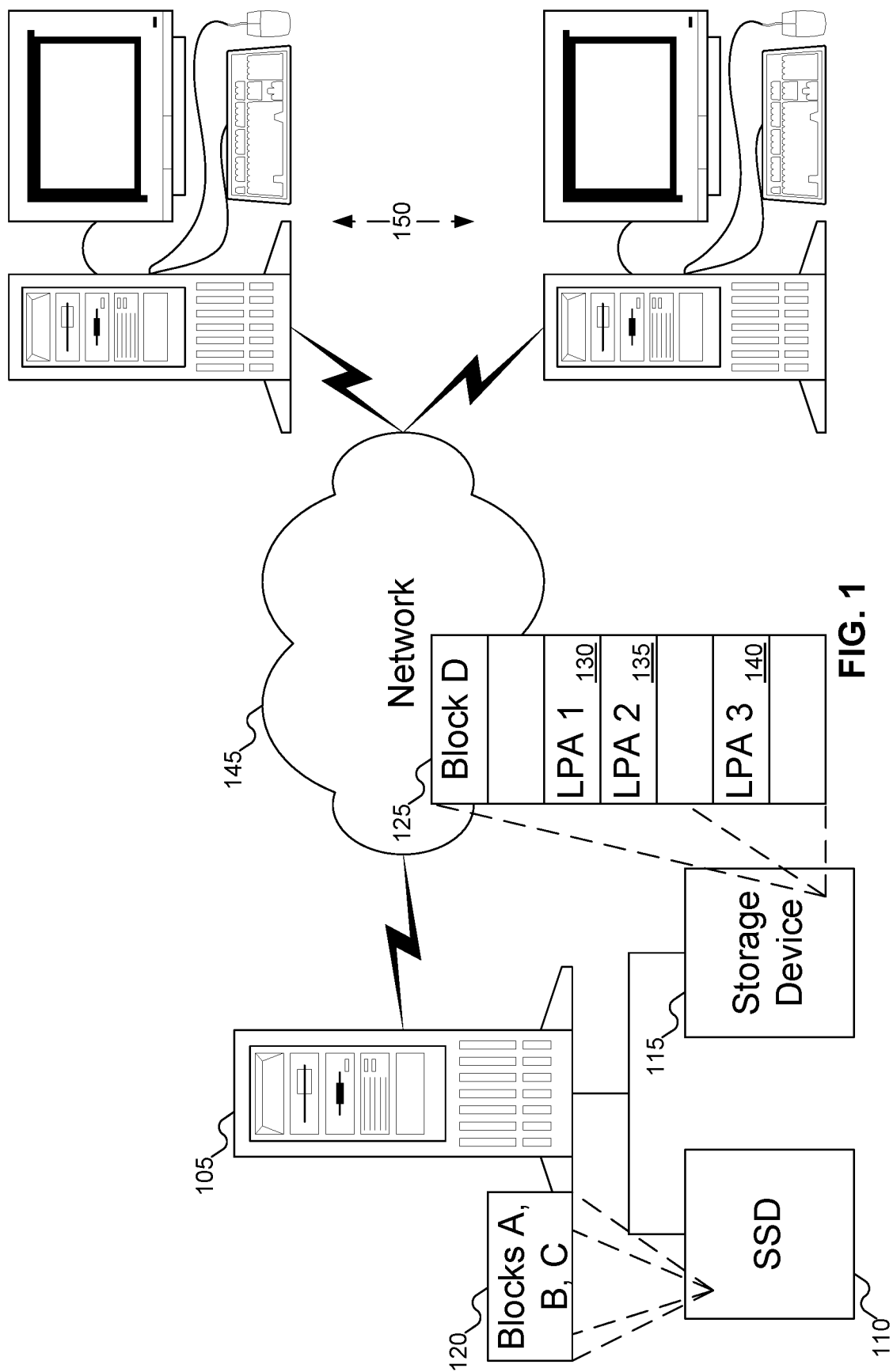
FIG. 1 shows a host machine including Solid State Drives (SSDs) in a distributed storage system, according to embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Data availability is a very important factor in most enterprise data center applications. Modern software-defined storage systems may use replication to repair failed disks and nodes. Typically, as seen in systems like Ceph, the default replication factor is three (that is, each unit of data exists in three locations within the distributed storage system). Multiple copies of the same data may exist to enable availability in case of failure in some part of the data center.

This redundancy may also provide a way to reduce the latency in critical input/output (I/O) due to garbage collection. Instead of performing a full Program/Erase (P/E) cycle, the Program operation may be deferred for data that is replicated elsewhere within the distributed storage system. The delayed Program operation may be performed at a later, more convenient time: either when the I/O load has dropped, or if enough time has passed since garbage collection was performed, for example. In this manner, the additional latency due to garbage collection is reduced to just the latency caused by the Erase operation. More particularly, critical I/O does not have to wait for valid data to be read from victim blocks (blocks targeted for garbage collection), copied into volatile RAM within the Solid State Drive (SSD), and written to another block on the SSD.

If a read request arrives at the SSD for data that was subject to the delayed Program operation but before the delayed Program operation was performed, the read request may be redirected to another device storing the requested data.

If a write request arrives at the SSD for data that was subject to the delayed Program operation but before the delayed Program operation was performed, the SSD may cache a replicated copy of the page, modify the data according to the write request, then write the modified page to the SSD.

Note that even though the SSD might be operating in a distributed storage system with multiple copies of data, if there are no copies of a valid page in a victim block, the valid page should be programmed as per the typical P/E cycle, to avoid loss of data.

In embodiments of the inventive concept, the host machine may decide adaptively (based on system load, I/O priority, or other criteria) which P/E strategy to use. Garbage collection may proceed as usual if an SSD is not notified to use the adaptive P/E strategy. The SSD controller may also request copies of valid pages from victim blocks that have been erased.

FIG. 1 shows a host machine including a Solid State Drive (SSD) in a distributed storage system, according to embodiments of the inventive concept. In FIG. 1, host machine 105 is shown. While FIG. 1 does not show all the internal components of host machine 105 (host machine 105 is shown in greater detail in FIG. 9), FIG. 1 shows host machine 105 including SSD 110 and storage device 115. Storage device 115 may be another SSD, or it may be another storage device, such as a more traditional hard disk drive. For purposes of this discussion, storage device 115 is treated as though it were another SSD. While FIG. 1 only shows SSD 110 and storage device 115, host machine 105 may theoretically support any number of storage devices, depending on how host machine 105 is configured.

SSD 110 is shown as including blocks A, B, and C 120; storage device 115 is shown as including block D 125. Blocks A, B, and C (120) are discussed more with reference to FIGS. 2-6 below. Block D 125 is shown as including various pages, including logical page addresses (LPA) 1 (130), LPA 2 (135), and LPA 3 (140), among others. While FIG. 1 shows block 125 as including six pages, blocks on SSD 110 and storage device 115 may include any number of pages, often far more than six.

When SSD 110 needs to perform garbage collection, SSD 110 may notify host machine 105. Host machine 105 may then decide when to instruct SSD 110 to perform garbage collection, and what P/E strategy to use.

Host machine 105 is shown connected to network 145. Network 145 may be any variety of network, including a Local Area Network (LAN), a Wide Area Network (WAN), or a global network, such as the Internet. Network 145 may be a wired or wireless network. Network 145 may also include multiple different varieties of networks in combination. For example, network 145 may include multiple LANs that include both wired and wireless access points and that may communicate with each other across a global network using a Virtual Private Network (VPN) to secure the communications. While FIG. 1 does not show a router and other devices attached thereto, network 145 may include routers, other host machines, network attached storage, and other devices as desired.

Also connected to network 145 are client machines 150. Client machines 150 may be any machines that access data from the distributed storage network. Although client machines 150 are shown as traditional tower (or minitower) computers, client machines 150 may include any other variety of machines, including but not limited to servers, laptop computers, tablet computers, and mobile devices such as smartphones. While FIG. 1 shows two client machines 150, any number of client machines may access data from the distributed storage system.

Figure 2:
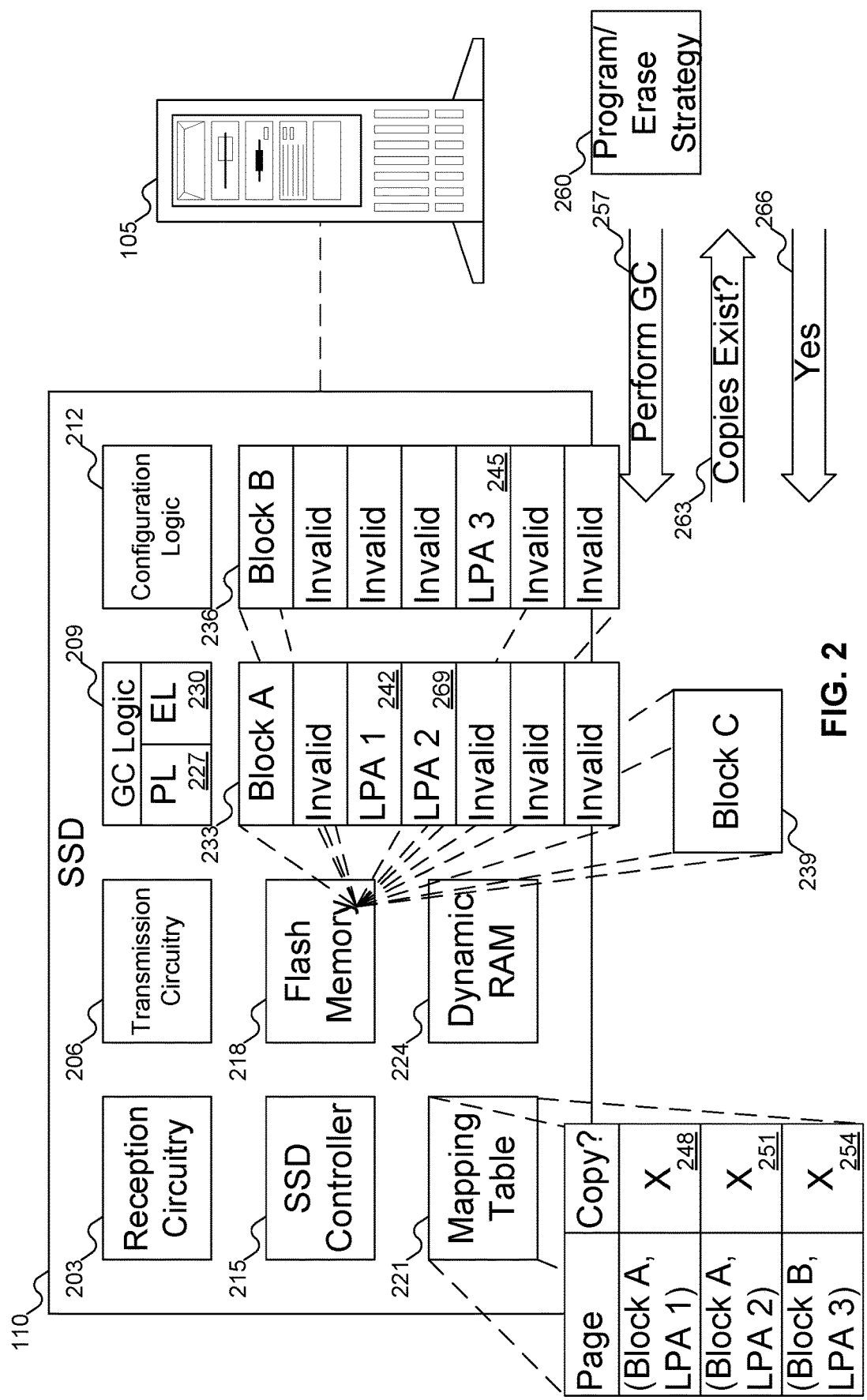
FIG. 2 shows details of the SSD of FIG. 1 and the SSD beginning garbage collection, according to an embodiment of the inventive concept.

FIG. 2 shows details of SSD 110 of FIG. 1, and the beginning of garbage collection on SSD 110 of FIG. 1 according to an embodiment of the inventive concept. In FIG. 2, SSD 110 is shown as including reception circuitry 203, transmission circuitry 206, garbage collection logic 209, configuration logic 212, SSD controller 215, flash memory 218, mapping table 221, and Dynamic Random Access Memory (RAM) 224. SSD 110 may use reception circuitry 203 and transmission circuitry 206 to receive and transmit information. Such information may include, for example, read and write requests from client machines 150, the results of read and write requests, instruction and data exchanges with host machine 105, among other possibilities. While FIG. 2 shows SSD 110 as including Dynamic RAM 224, memory, such as Static RAM, may be used in place of Dynamic RAM 224.

SSD 110 may use garbage collection logic 209 to perform garbage collection. As described above, garbage collection may include both Program and Erase operations: but in embodiments of the inventive concept, the Program operations may follow, rather than precede, the Erase operations. To support garbage collection, garbage collection logic 209 may include Program logic 227, which may perform Program operations, and Erase logic 230, which may perform Erase operations.

SSD 110 may use configuration logic 212 to configure SSD 110 to only perform garbage collection when instructed to do so by host machine 105. Otherwise, SSD 110 might perform garbage collection whenever SSD 110 determines garbage collection is needed, which could interfere with read and write requests from client machines 150, causing undesirable delay.

SSD controller 215 may manage the overall operation of SSD 110. For example, SSD controller 215 may interface with Dynamic RAM 224 to manage any information stored therein and direct read and write requests from client machines 150 appropriately, among other possibilities.

While FIG. 2 shows SSD controller 215 as a separate component within SSD 110 relative to, for example, garbage collection logic 209 and configuration logic 212, SSD controller 215 may include those components. That is, SSD controller 215 may include various components shown in FIG. 2, rather than those components being separate from SSD controller 215.

Flash memory 218 may store data in non-volatile memory. FIG. 2 shows blocks A, B, and C (233, 236, and 239) as stored in flash memory 218. Blocks A and B (233 and 236) include a number of invalid pages, along with three valid LPAs (242, 245, and 245), and are intended to represent blocks to be erased during a garbage collection operation: block C (239) is intended to represent a block with free pages. As described above, while FIG. 2 shows blocks A and B (233 and 236) with six pages, blocks A and B (233 and 236), along with block C (239), may have any number of pages, and often will have more than six pages.

Mapping table 221 provides information about victim blocks being erased. For example, if blocks A and B (233 and 236) are selected as victim blocks for erasure, mapping table 221 may store information about whether any valid pages in these blocks are replicated elsewhere within the distributed storage system. As shown in FIG. 1, storage device 115 of FIG. 1 may store block D (125) of FIG. 1, which is shown as including LPAs 1, 2, and 3 (130, 135, and 140). Thus, in FIG. 2, mapping table 221 may indicate that LPAs 1 and 2 in block A, and LPA 3 in block B, are replicated, as shown by marks 248, 251, and 254. Mapping table 221 may be stored in Dynamic RAM 224, which may be used to store other information of a temporary nature. For example, when client machines 150 of FIG. 1 update data stored in flash memory 218, the page may be copied into dynamic RAM 224, updated, then written to a free page in flash memory 218.

In FIG. 2, SSD 110 may receive instruction 257 from host machine 105. Instruction 257 may be an instruction to perform garbage collection. Host machine 105 may include P/E strategy 260, which may specify whether SSD 110 should use the default P/E strategy or an adaptive P/E strategy. The default P/E strategy may be to perform a Program operation (that is, copy valid pages from victim blocks 233 and 236 to other blocks, such as block C (239)) before erasing victim blocks 233 and 236. In contrast, the adaptive P/E strategy may be to delay the Program operation, if host machine 105 wants to avoid any delay incurred due to the Program operation.

Where P/E strategy 260 specifies an adaptive P/E strategy, SSD 110 may determine if there are any valid pages in victim blocks 233 and 236 that would normally require a Program operation. If so, then SSD 110 may send query 263 to host machine 105 to determine whether there are replicated copies of the valid pages. Upon receiving reply 266 from host machine 105, SSD 110 may update mapping table 221 to reflect which valid pages in victim blocks 233 and 236 will require later replication. Note that if reply 266 indicates that some valid pages in victim blocks 233 and 236 are not replicated, then those pages may need to be Programmed, despite the fact that P/E strategy 260 specified an adaptive P/E strategy. This is because, due to lack of replication, the data in those valid pages could be lost if those valid pages were not Programmed first.

While FIG. 2 describes blocks A and B (233 and 236) as being selected as victim blocks 233 and 236, any number of blocks may be selected as victim blocks, using whatever criteria are programmed into SSD 110. Thus, only one of blocks A and B (233 and 236) might be selected as a victim block, or other blocks might selected as victim blocks.

Figure 3:
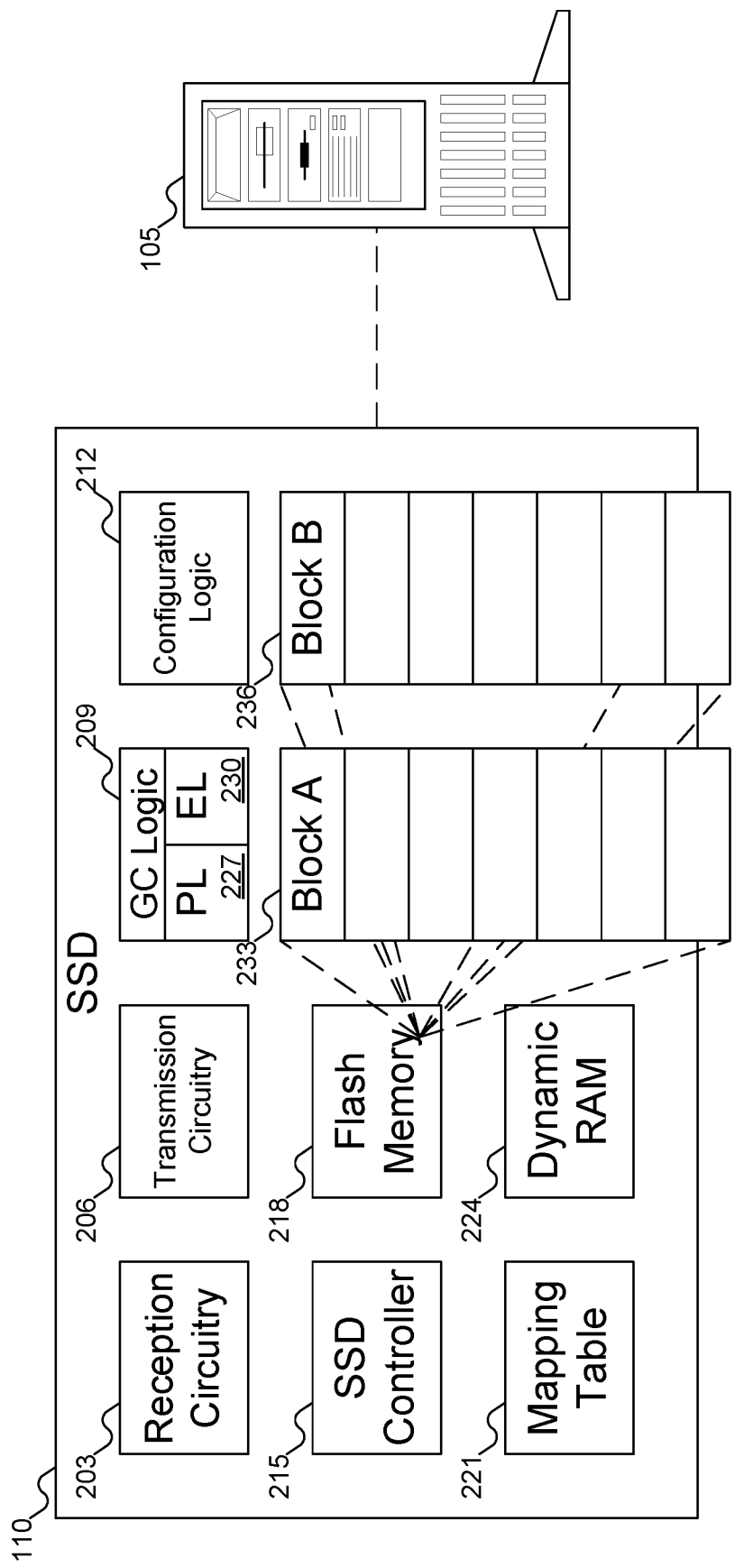
FIG. 3 shows the SSD of FIG. 2 performing an Erase operation.

FIG. 3 shows SSD 110 of FIG. 2 performing an Erase operation. In FIG. 3, SSD 110—more specifically, Erase logic 230—has Erased victim blocks 233 and 236, so that all the pages in victim blocks 233 and 236 are now free. Because P/E strategy 260 of FIG. 2 specified an adaptive P/E strategy, victim blocks 233 and 236 were erased without first programming the valid pages in victim blocks 233 and 236. There is no concern that replicated copies of the valid data that was not Programmed might not exist on other storage devices (such as storage device 115 of FIG. 1): query 263 and reply 266 of FIG. 2 may indicate whether replicated copies of the valid data exist elsewhere. If query 263 and reply 266 of FIG. 2 indicate that replicated copies of the valid pages in victim blocks 233 and 236 do not exist elsewhere, SSD 110 may Program those pages (specifically, the valid pages in victim blocks 233 and 236 for which no replicated copies exist), despite P/E strategy 260 of FIG. 2 being an adaptive P/E strategy.

Note also the SSD 110 may ignore P/E strategy 260 of FIG. 2 (or more precisely, P/E strategy 260 of FIG. 2 becomes irrelevant) if there are no valid pages in victim blocks 233 and 236. Put another way, if victim blocks 233 and 236 only contain invalid pages, there is no data that requires Programming, either before or after an Erase operation.

Figure 4:
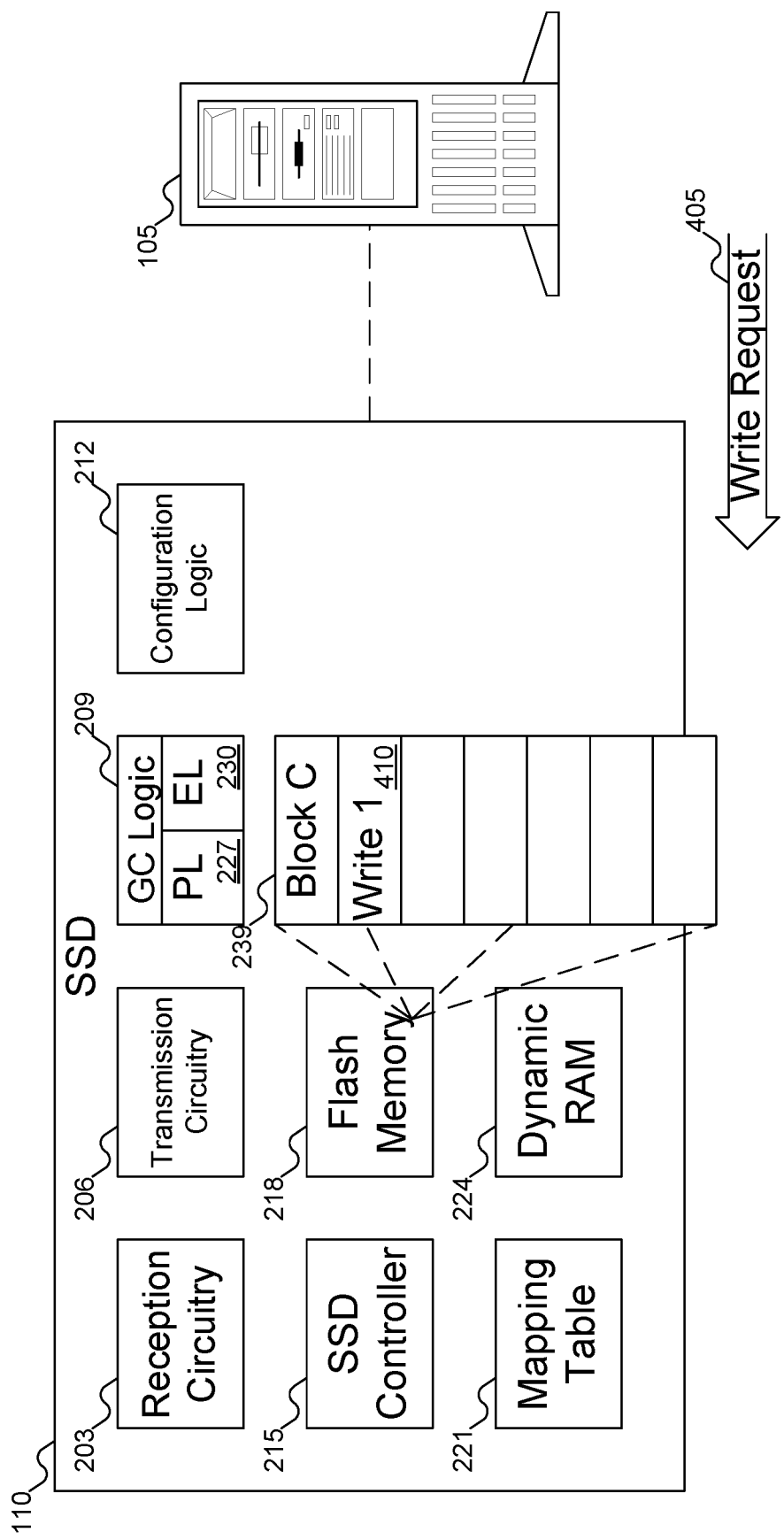
FIG. 4 shows the SSD of FIGS. 2-3 completing a write request.

FIG. 4 shows SSD 110 of FIGS. 2-3 completing a write request. In FIG. 4, after victim blocks 233 and 236 of FIGS. 2-3 have been Erased, but before copies of the valid data have been obtained for delayed Programming, host machine 105 transmits write request 405 to SSD 110. SSD 110 may then write the data as Write 1 (410) to block C (239), even before SSD 110 performs the delayed Program operation.

Figure 5:
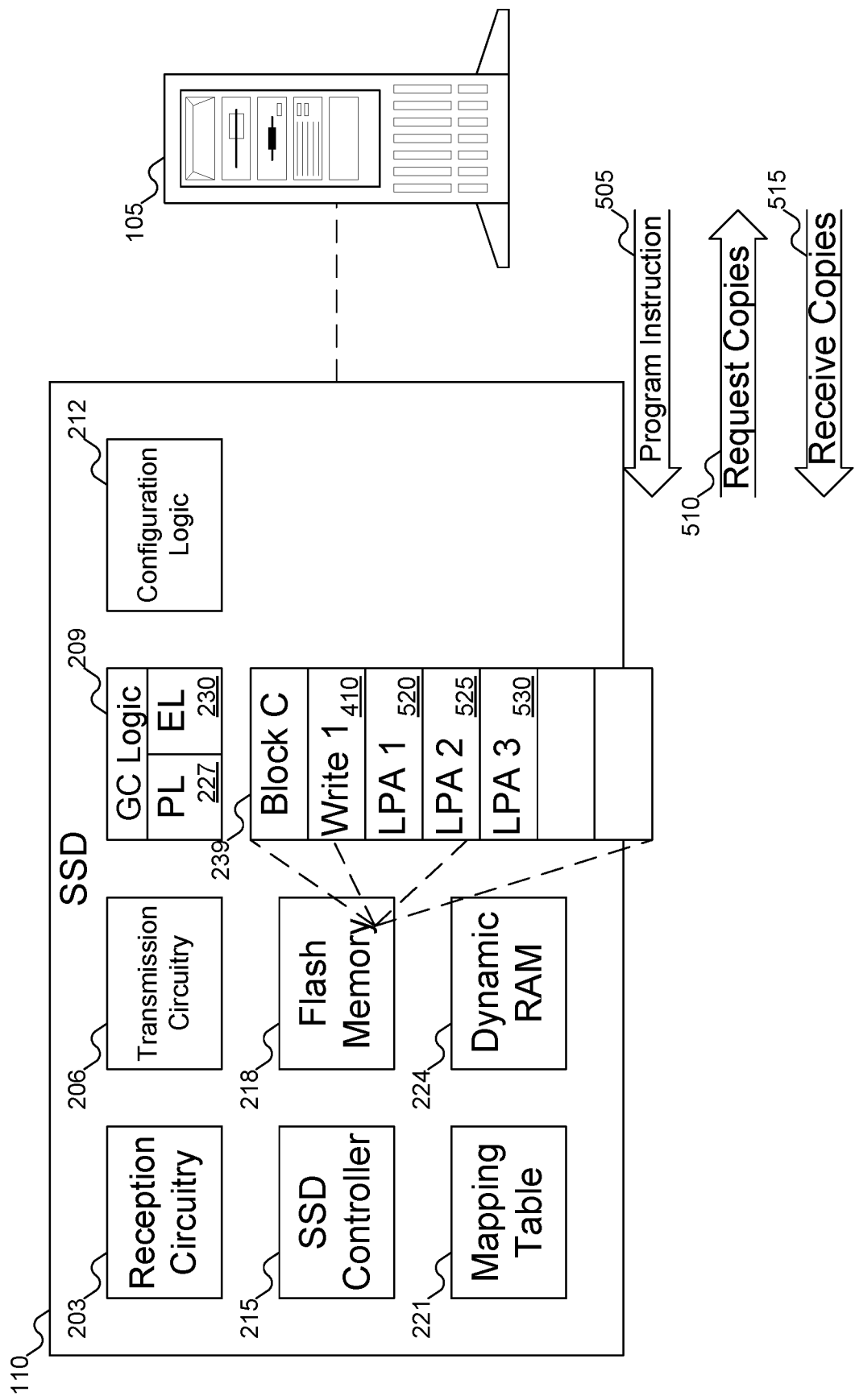
FIG. 5 shows the SSD of FIGS. 2-4 performing a delayed Program operation.

FIG. 5 shows SSD 110 of FIGS. 2-4 performing a delayed Program operation. In FIG. 5, host machine 105 sends Program instruction 505 to SSD 110. Program instruction 505 tells SSD 110 that it is time to perform the delayed Program operation. SSD 110 may then send request 510 to host machine 105, requesting copies of the valid pages that were Erased without being Programmed when garbage collection occurred. SSD 110 may then receive copies 515 from host machine 105, and may then write copies 515 to block C (239), as pages 520, 525, and 530.

While FIG. 5 shows SSD 110 sending request 510 to host machine 105, as shown in FIG. 2, SSD 110 may send query 263 of FIG. 2 to host machine 105, asking whether the valid pages in victim blocks 233 and 236 of FIG. 2 are replicated. In some embodiments of the inventive concept, host machine 105 may remember which pages were included in query 263 of FIG. 2, and may send copies 515 as part of instruction 505, avoiding the need for SSD 110 to send request 510 to host machine 105.

FIGS. 2-5 show how a delayed Program operation may be used to reduce the potential delay to read and write requests. In particular, FIG. 4 shows how a write request may be processed before SSD 110 performs the delayed Program operation. But what if write request 405 of FIG. 4 had been to modify some of the data that had been in one of the valid pages in victim blocks 233 and 236 of FIGS. 2-3? Put another way, what if client machines 150 of FIG. 1 had attempted to modify data that was Erased from SSD 110 without having been Programmed?

Figure 6:
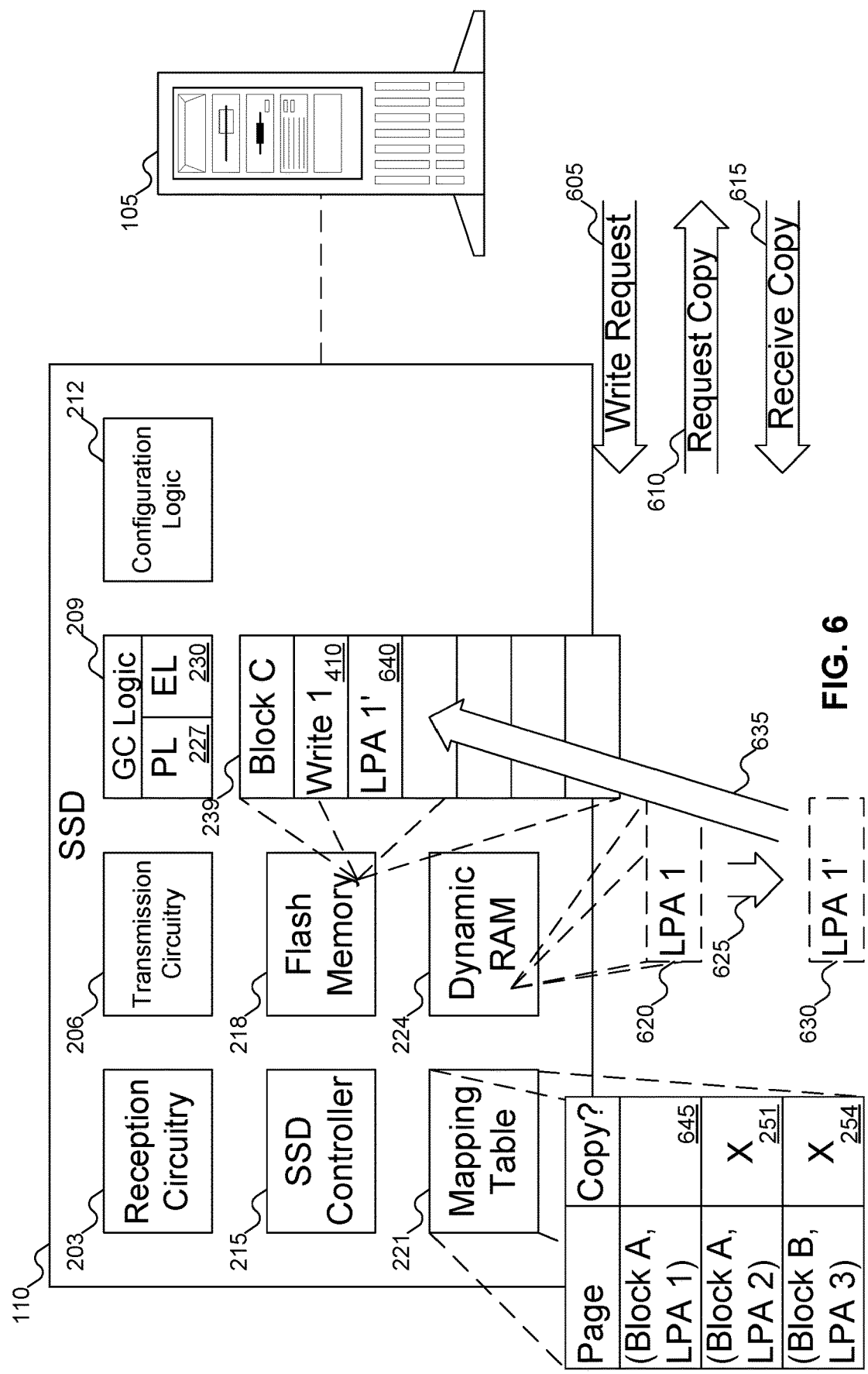
FIG. 6 shows the SSD of FIGS. 2-3 completing a write request on data subject to a delayed Program operation.

FIG. 6 shows SSD 110 of FIGS. 2-3 completing a write request on data subject to a delayed Program operation. In FIG. 6, host machine 105 sends write request 605 to SSD 110. But unlike write request 405 of FIG. 4, write request 605 modifies data in one of the valid pages of victim blocks 233 and 236 of FIG. 2: in this example, write request 605 may modify LPA 1 (242 of FIG. 2). Since SSD 110 no longer stores that page (having delayed the Program operation), SSD 110 may send request 610 to host machine 105, asking for a copy of the page. Host machine 105 may then send copy 615 to SSD 110, which SSD 110 may store in Dynamic RAM 224 as cached copy 620. SSD 110 may then modify cached copy 620 as per write request 605, shown as transition 625, producing modified cached copy 630. SSD 110 may then write modified cached copy 630 to block C (239), shown as transition 635, to page 640. Finally, since SSD 110 has updated LPA 1 (242 of FIG. 2), SSD 110 may update mapping table 221 to reflect that SSD 110 no longer needs a copy of LPA 1 (242 of FIG. 2): this is shown by removing mark 645 from mapping table 221.

Figure 7:
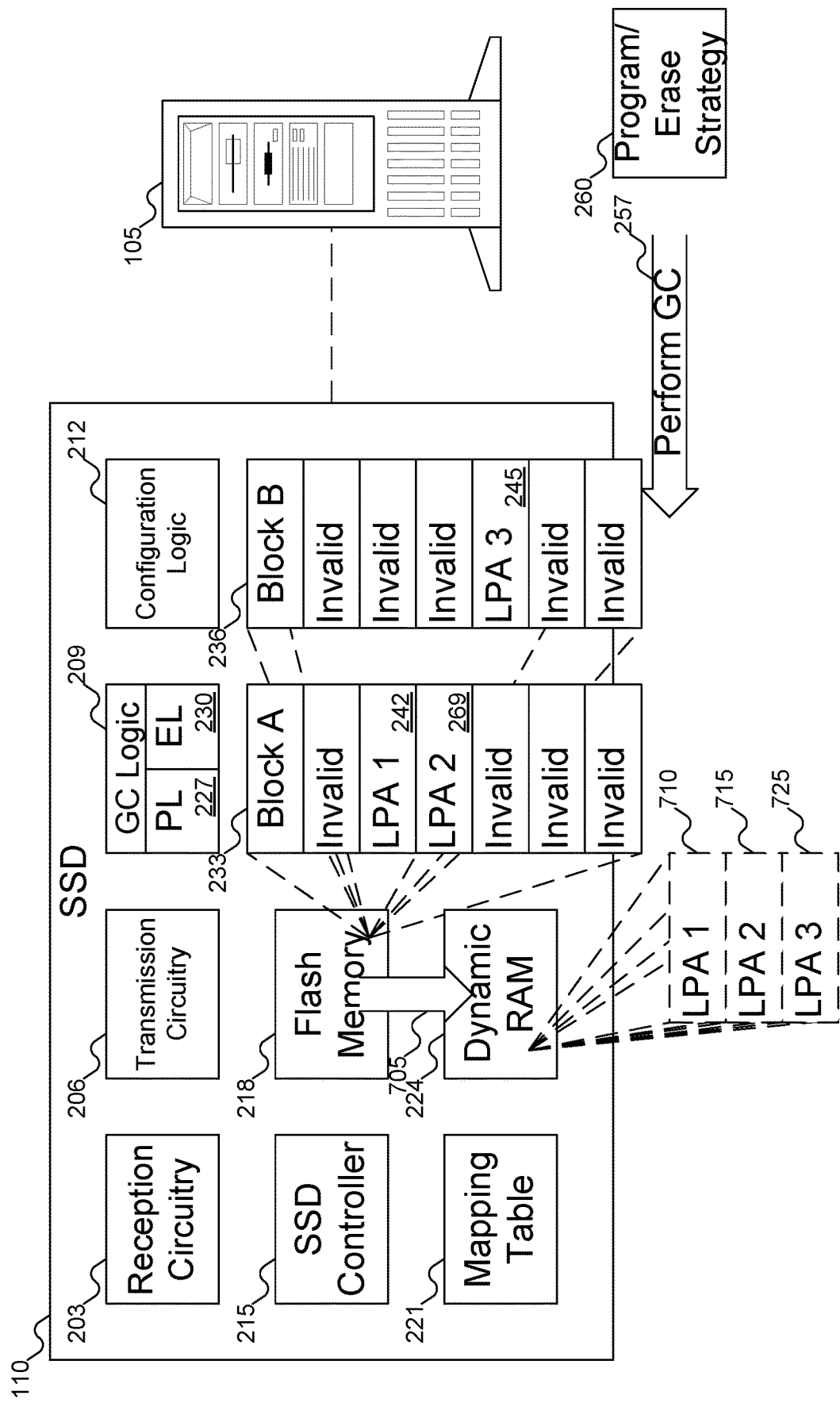
FIG. 7 shows the SSD of FIG. 2 beginning garbage collection, according to an alternative embodiment of the inventive concept.
Figure 8:
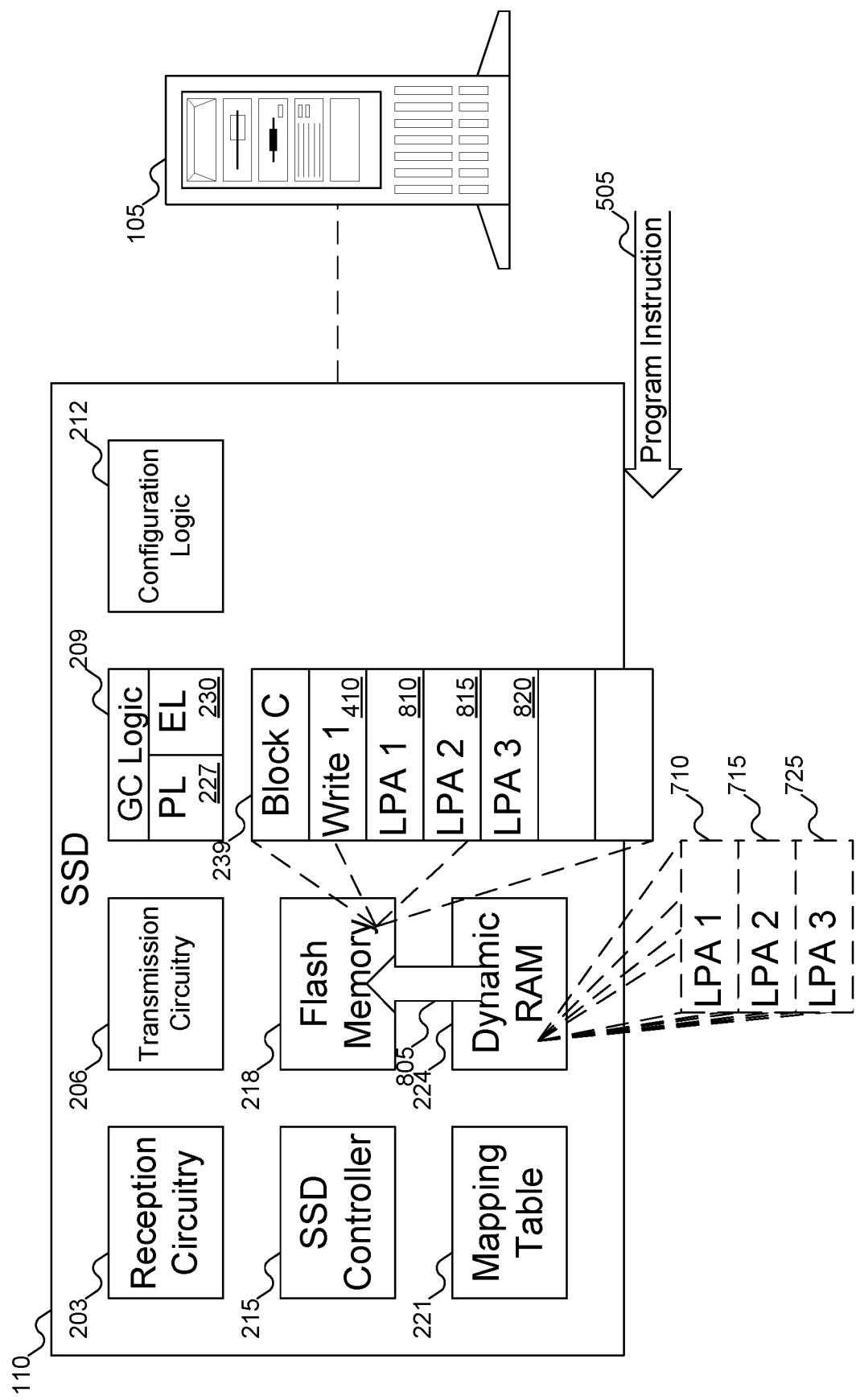
FIG. 8 shows the SSD of FIG. 7 performing a delayed Program operation.

While SSD 110 may request host machine 105 as described above, in other embodiments of the inventive concept, SSD 110 may cache copies of the valid data before performing garbage collection. That is, when P/E strategy 260 of FIG. 2 is adaptive P/E strategy, SSD 110 may copy the valid data and store the copy as cached copy 620 in Dynamic RAM 224, without needing to request a copy of the valid data from host machine 105. FIGS. 7-8 illustrate this alternative embodiment of the inventive concept.

FIG. 7 shows the SSD of FIG. 2 beginning garbage collection, according to an alternative embodiment of the inventive concept. In FIG. 7, SSD 110 may receive instruction 257 to perform garbage collection: instruction 257 may specify which P/E strategy 260 to use. Where P/E strategy 260 specifies an adaptive P/E strategy, instead of querying host machine 105 about the existence of replicated copies of the valid data in blocks A and B (233 and 236), SSD 110 may cache the valid data within Dynamic RAM 224, shown as transition 705. Dynamic RAM 224 may store cached copies 710, 715, and 720 until SSD 110 receives instruction to perform the delayed Program operation.

Caching valid data may also be an appropriate strategy when SSD 110 of FIG. 2 determines that there are no replicated copies of valid data, as described above reference to FIG. 2. Rather than Programming those pages immediately despite an adaptive P/E strategy being specified, SSD 110 may cache the valid pages in Dynamic RAM 224, and write the cached pages to flash memory 218 later.

SSD 110 may also cache valid data as a safeguard against data loss or to maintain the target number of replicated copies of data. That is, SSD 110 may store copies of valid data in Dynamic RAM 224 in case the replicated copies of the valid data might be lost or for other reasons, for example, due to a failure of the drives storing the replicated copies of the valid data. If the copies of the valid data are still resident in Dynamic RAM 224 when the delayed Program operation is started, SSD 110 may access those copies instead of the replicated copies on the other drives, as accessing the copies in Dynamic RAM 224 would typically have a lower latency than replicated copies on other drives.

Whether SSD 110 accesses the cached (or backup) copies of the valid data rather than the replicated copies on other drives may depend on which copy is more likely to have up-to-date data. Which copy is more likely to be update-to-date may depend on various factors, such as the caching policy and the order in which copies are written within the distributed storage system. For example, if SSD 110 is the last device to receive an instruction to write data, other devices storing replicated copies of the valid data may be more likely to be up-to-date.

FIG. 8 shows the SSD of FIG. 7 performing a delayed Program operation. In FIG. 8, SSD 110 has already processed write request 405 of FIG. 4, which accounts for write 1 (410) in block C (239). When reception circuitry 203 receives Program instruction 505, SSD 110, as part of transition 805, may copy cached copies 710, 715, 725 back to flash memory 218, shown as pages 810, 815, and 820. SSD 110 may then delete cached copies 710, 715, and 725 from Dynamic RAM 224.

Figure 9:
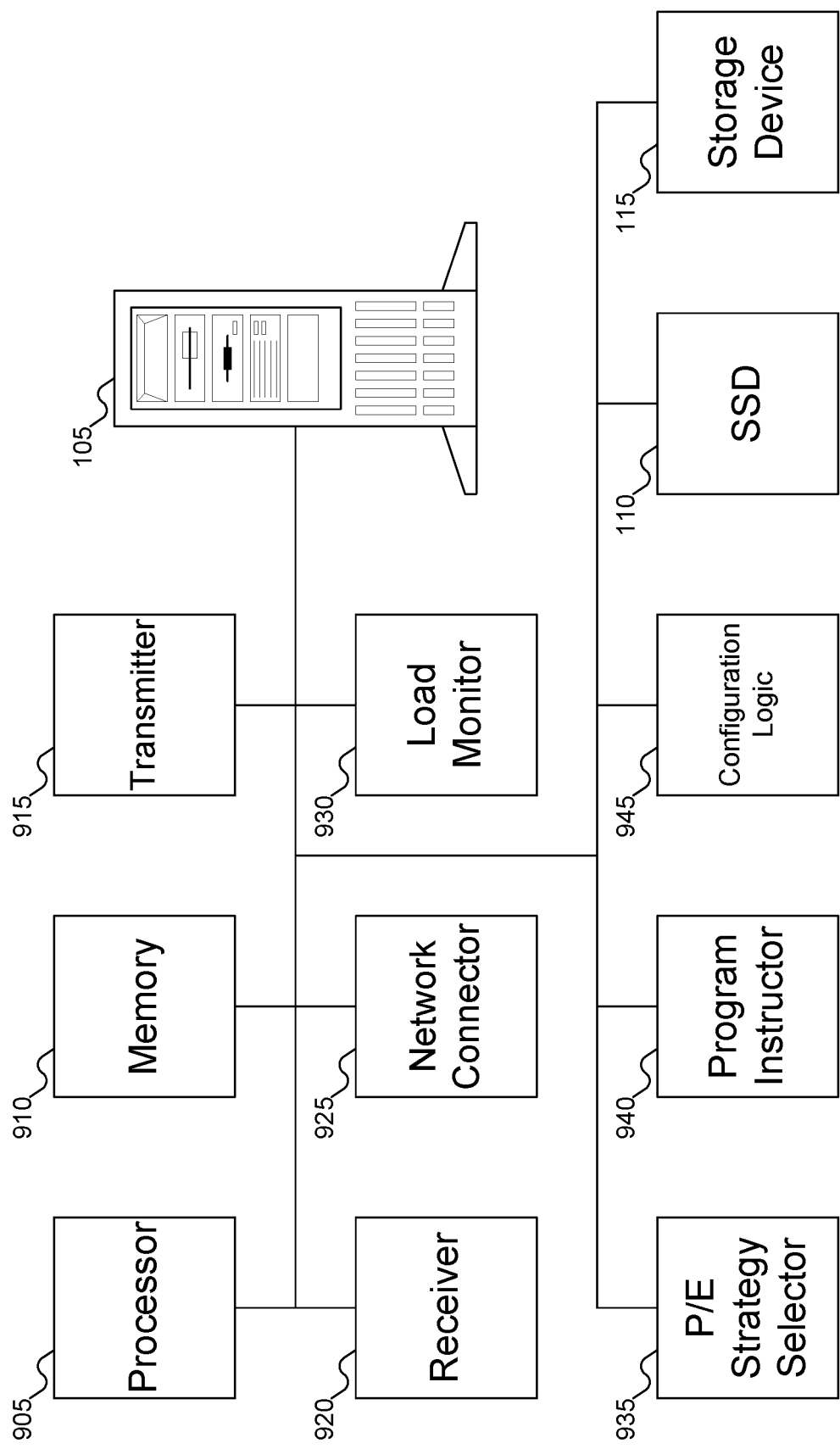
FIG. 9 shows details of the host machine of FIG. 1.

FIG. 9 shows details of the host machine of FIG. 1. In FIG. 9, host machine 105 may include processor 905, memory 910, transmitter 915, receiver 920, network connector 925, load monitor 930, P/E strategy selector 935, Program instructor 940, configuration logic 945, SSD 110, and storage device 115. Processor 905 and memory 910 may be any desired varieties of central processing unit and memory (either volatile or non-volatile) to support the operation of host machine 105. Transmitter 915 and receiver 920 may be used to transmit from and receive at host machine 105, respectively information from any of a variety of sources, including SSD 110, storage device 115, and client machines 150 of FIG. 1 (via network connector 925 and network 145 of FIG. 1). Network connector 925 may be any variety of network connector including, for example, an Ethernet network card or a wireless network card. Note that while FIG. 9 suggests that SSD 110 may be installed in host machine 105, SSD 110 may be in communication with host machine 105 while being installed somewhere else.

Load monitor 930 may monitor the I/O load on host machine 105 (or, in some embodiments of the inventive concept, the distributed storage system generally). Typically, the I/O load on the distributed storage system may vary, as client machines 150 of FIG. 1 or other devices need to access more or less data on SSD 110, storage device 115 of FIG. 1, and other storage devices in the distributed storage system. When client machines 150 of FIG. 1 make more requests to access data, the I/O load is higher; when client machines 150 of FIG. 1 make fewer requests to access data, the I/O load is lower. Load monitor 930 may track the number of access requests as time passes and calculate a value for the I/O load.

Given the I/O load as calculated by load monitor 930, P/E strategy selector 935 select a P/E strategy to use when SSD 110 (or another SSD on host machine 105) needs to perform garbage collection. If the I/O load is low, the default P/E strategy (to perform a Program operation before performing an Erase operation) may be selected; otherwise, the adaptive P/E strategy (to delay the Program operation) may be selected. Transmitter 915 may then be used to transmit instruction 257 of FIG. 2, along with selected P/E strategy 260 of FIG. 2, to SSD 110.

Program instructor 940 may determine when SSD 110 should perform a delayed Program operation. As will be described further below with reference to FIGS. 12-13, Program instructor 940 may determine when SSD 110 should perform a delayed Program operation based on either the I/O load or how much time has passed since SSD 110 performed the Erase operation.

Finally, host machine 105 may use configuration logic 945 to instruct SSD 110 (and any other SSDs in host machine 105) to only perform garbage collection when instructed to do so by host machine 105. As described above, having SSD 110 perform garbage collection upon instruction by host machine 105 may avoid SSD 110 performing a Program operation during a period of high I/O load.

In FIG. 9, various components, such as load monitor 930, P/E strategy selector 935, program instructor 940, and configuration logic 945 are shown. These components, individually or collectively, may be implemented as hardware elements within host machine 105, or as software elements executed on processor 905.

Figure 10:
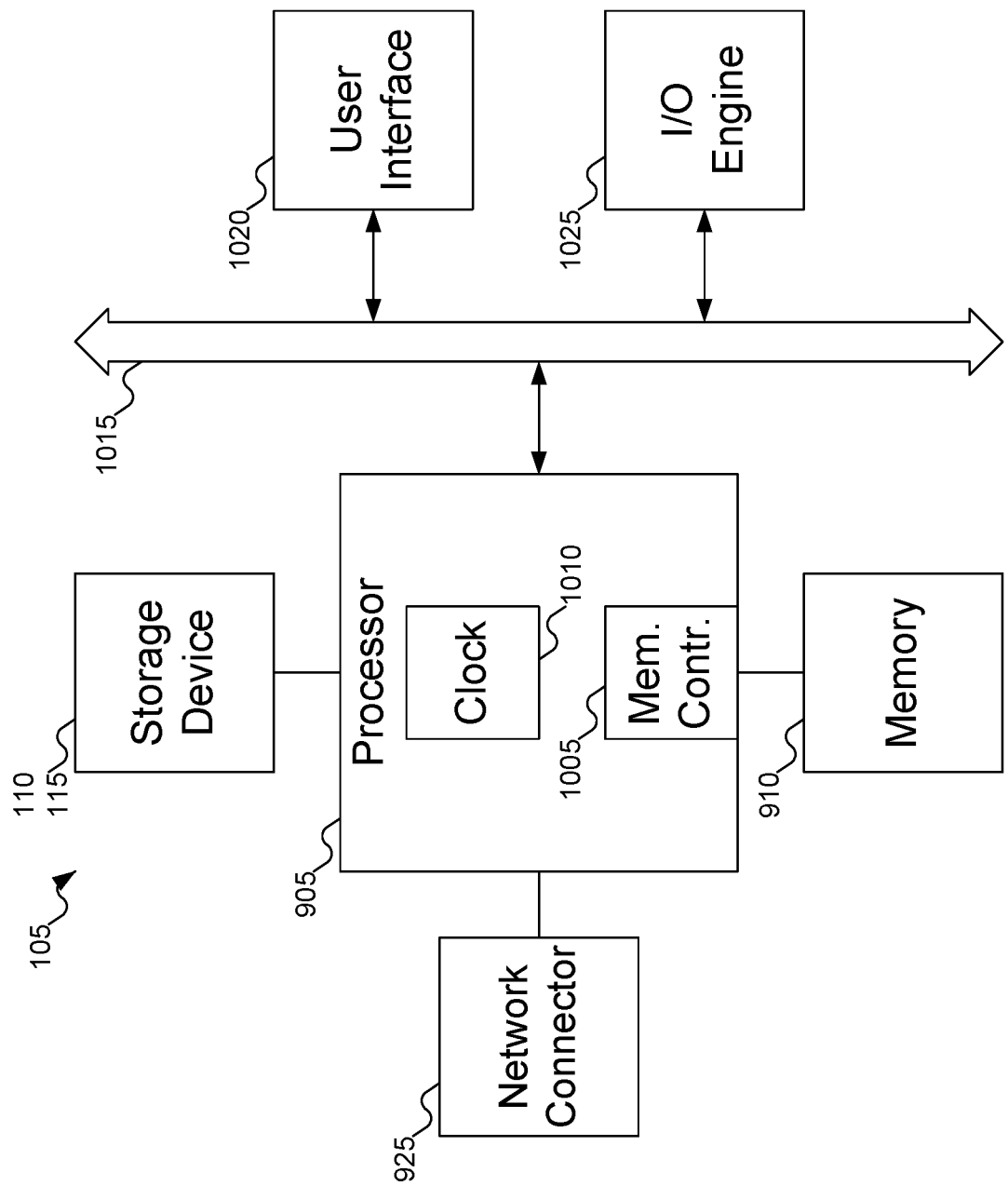
FIG. 10 shows further details of the host machine of FIG. 9.

FIG. 10 shows further details of host machine 105 of FIG. 9. In FIG. 10, typically, host machine 105 include one or more processors 905, which may include memory controller 1005 and clock 1010, which may be used to coordinate the operations of the components of host machine 105. Processors 905 may also be coupled to memory 910, which may include random access memory (RAM), read-only memory (ROM), or other state preserving medium, as examples. Processors 905 may also be coupled to storage devices 110 and 115, and to network connector 925, which may be, for example, an Ethernet connector. Processors 905 may also be connected to a bus 1015, to which may be attached user interface 1020 and input/output interface ports that may be managed using input/output engine 1025, among other components.

Figure 11:
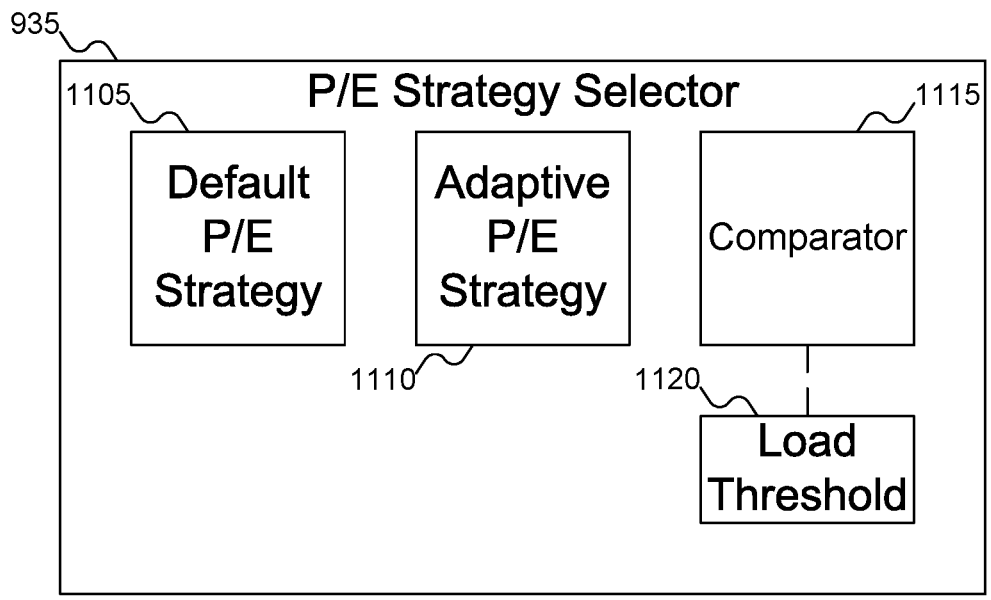
FIG. 11 shows details of the Program/Erase (P/E) strategy selector of FIG. 9.

FIG. 11 shows details of P/E strategy selector 935 of FIG. 9. In FIG. 11, P/E strategy selector 935 may include default P/E strategy 1105, adaptive P/E strategy 1110, and comparator 1115. As described above, default P/E strategy 1105 instructs SSD 110 of FIG. 2 to perform the default Program/Erase sequence when performing garbage collection. Thus, after SSD 110 of FIG. 2 identifies victim blocks 233 and 236 of FIG. 2, SSD 110 of FIG. 2 (using garbage collection logic 209 of FIG. 2) may Program any valid pages in the selected victim blocks using Program logic 227, then Erase the selected victim blocks using Erase logic 230 of FIG. 2.

On the other hand, adaptive P/E strategy 1110 instructs SSD 110 of FIG. 2 to perform only the Erase operation, deferring the Program operation until later. Thus, after SSD 110 of FIG. 2 identified victim blocks 233 and 236 of FIG. 2, SSD 110 of FIG. 2 (using garbage collection logic 209 of FIG. 2) may verify with host machine 105 of FIG. 2 that all valid pages in victim blocks 233 and 236 of FIG. 2 are replicated, then Erase the selected victim blocks using Erase logic 230 of FIG. 2. Later, when instructed by Program instructor 940 of FIG. 9, SSD 110 may perform the delayed Program operation using Program logic 227 of FIG. 2, accessing valid pages from replicated copies via host machine 105 of FIG. 2. (If host machine 105 may not verify that all valid pages in victim blocks 233 and 236 of FIG. 2 are replicated, then any valid pages that are not replicated should be Programmed using Program logic 227 of FIG. 2 before Erase logic 230 of FIG. 2 performs the Erase operation, to prevent loss of data.)

P/E strategy selector 935 may select between default P/E strategy 1105 and adaptive P/E strategy 1110 using the I/O load, as determined by load monitor 930 of FIG. 9. P/E strategy selector 935 may compare the I/O load with load threshold 1120, using comparator 1115. If the comparison indicates that the I/O load is high (i.e., higher then load threshold 1120), then P/E strategy selector 935 may select adaptive P/E strategy 1110. Otherwise, P/E strategy selector 935 may select default P/E strategy 1105. Load threshold 1120 may be set to any desired value, and may vary over time if it is determined that the current value for load threshold 1120 is too high or too low.

Figure 12:
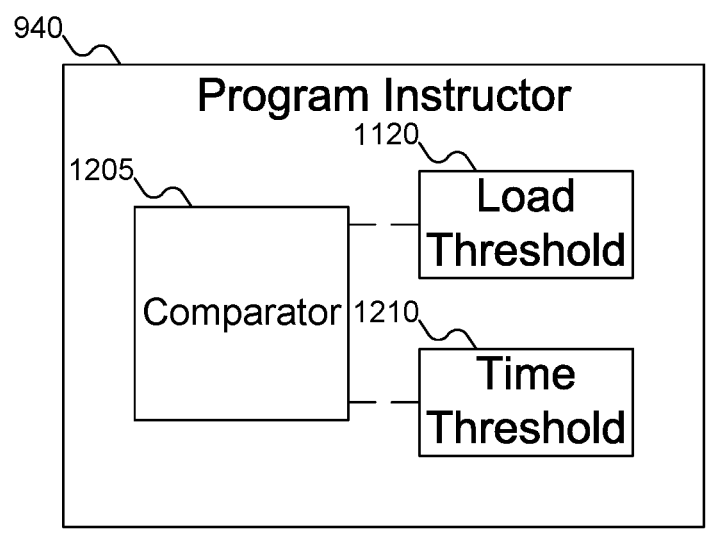
FIG. 12 shows details of the Program instructor of FIG. 9.

FIG. 12 shows details of Program instructor 940 of FIG. 9. In FIG. 12, Program instructor 940 is shown as including comparator 1205, load threshold 1120, and time threshold 1210. Program instructor 940 may receive the I/O load from Load monitor 930 of FIG. 9, and may compare the I/O load with load threshold 1120. If the I/O load from Load monitor 930 of FIG. 9 drops below load threshold 1120 (as determined by comparator 1205), then Program instructor 940 may instruct SSD 110 of FIG. 2 to perform the delayed Program operation.

Program instructor 940 may also track how much time has passed since SSD 110 of FIG. 2 performed garbage collection using adaptive P/E strategy 1110 of FIG. 11. If too much time has passed, program instructor 940 may instruct SSD 110 of FIG. 2 to perform the delayed Program operation, even though the I/O load as determined by load monitor 930 of FIG. 9 might still be above load threshold 1120. In this manner, a delayed Program operation does not wait forever, which would prevent valid pages that were Erased without being Programmed from being recovered on SSD 110 of FIG. 2.

Although FIG. 12 shows program instructor 940 using the same load threshold 1120 as P/E strategy selector 935 of FIG. 11, in some embodiments of the inventive concept program instructor 940 may use a different load threshold 1120. That is, the load threshold used to select whether to use default P/E strategy 1105 of FIG. 11 or adaptive P/E strategy 1110 of FIG. 11 may be different from the load threshold used to determine when to perform a delayed Program operation. For example, since the latency of concern in embodiments of the inventive concept is the latency associated with performing a Program operation, the load threshold used to select a P/E strategy might be lower than the load threshold used to determine when to perform a delayed Program operation. As with load threshold 1120 of FIG. 11, the load threshold used by program instructor 940 may be either static or varying over time.

Figure 13:
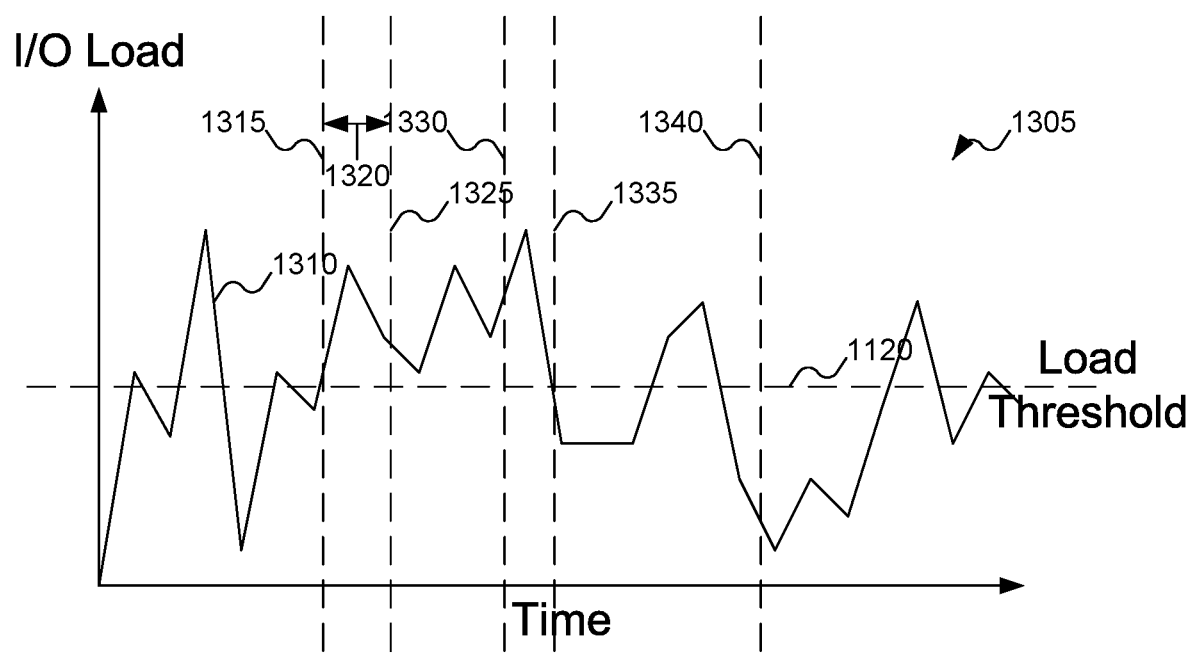
FIG. 13 shows a graph of the I/O load of the host machine of FIG. 9 over time.

FIG. 13 shows a graph of an example I/O load of the host machine of FIG. 9 over time. In FIG. 13, graph 1305 plots I/O load 1310 over time. For reference, load threshold 1120 is also shown. At time 1315, hosts machine 105 of FIG. 2 may instruct SSD 110 of FIG. 2 to perform garbage collection. Because I/O load 1310 is higher than load threshold 1120 at time 1315, P/E strategy selector 935 of FIG. 9 may select to use adaptive P/E strategy 1110 of FIG. 11.

For some interval after time 1315, I/O load 1310 is higher than load threshold 1120. Thus, after duration 1320 exceeds time threshold 1210 of FIG. 12, at time 1325 program instructor 940 may instruct SSD 110 of FIG. 2 to perform the delayed Program operation, even though I/O load 1310 is still higher than load threshold 1120.

At time 1330, host machine 105 of FIG. 2 may again instruct SSD 110 of FIG. 2 to perform garbage collection. Since at time 1330 I/O load 1310 is higher than load threshold 1120, P/E strategy selector 935 of FIG. 9 may again select to use adaptive P/E strategy 1110 of FIG. 11. But eventually, at time 1335, I/O load 1310 drops below load threshold 1120. At this point, program instructor 940 of FIG. 9 may instruct SSD 110 of FIG. 2 to perform the delayed Program operation.

Finally, at time 1340, host machine 105 may again instruct SSD 110 of FIG. 2 to perform garbage collection. Because at time 1340 I/O load 1310 is lower than load threshold 1120, P/E strategy selector 935 of FIG. 9 may select to use default P/E strategy 1105 of FIG. 11.

While FIG. 13 is described above as though all garbage collection instructions are issued to the same SSD, the different garbage collection instructions could be issued to different SSDs in communication with host machine 105 of FIG. 2. Thus, the various garbage collection operations described above are not necessarily all performed by the same SSD.

Figure 14A:
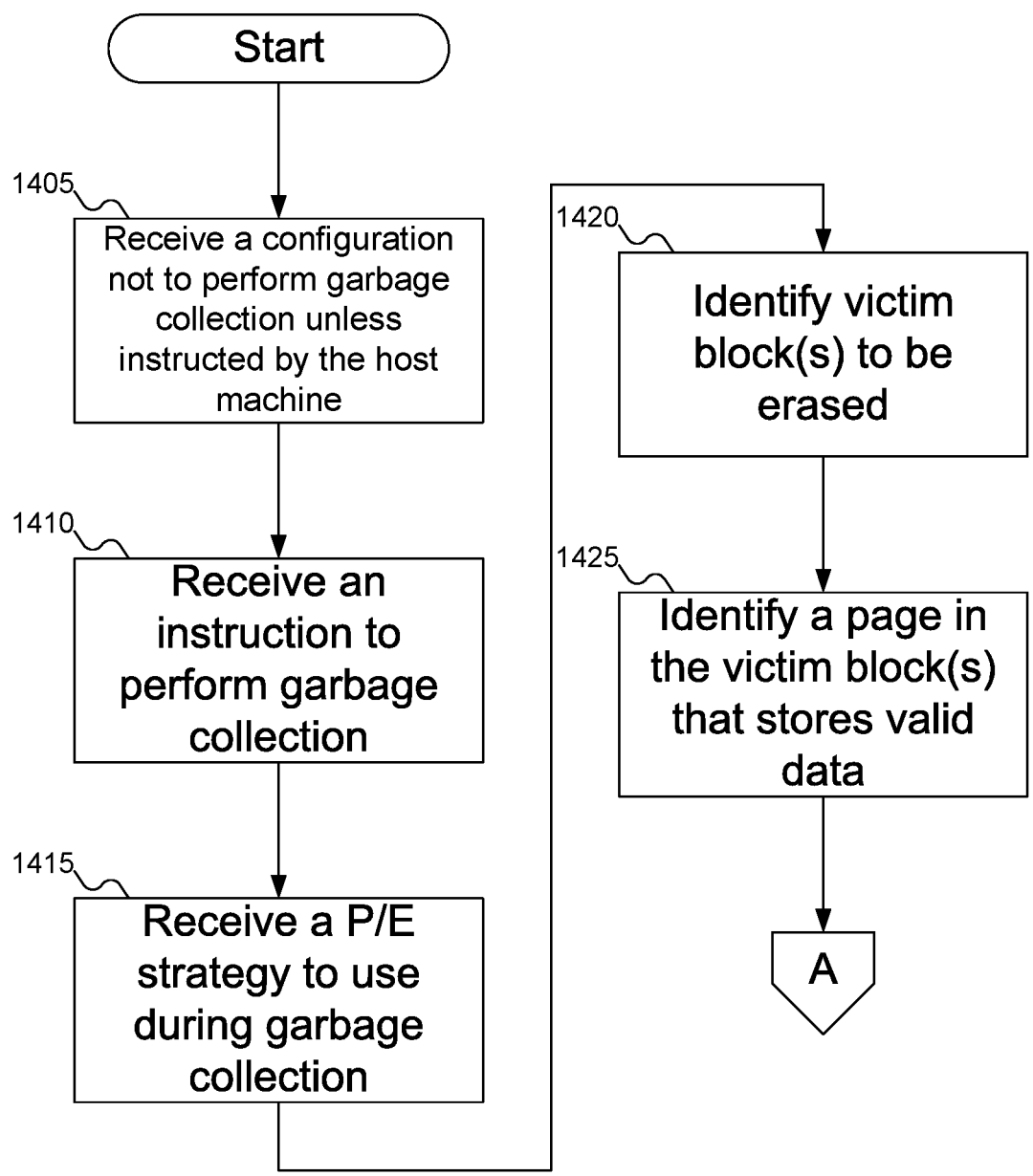
FIGS. 14A-14C show a flowchart of a procedure for the SSD of FIGS. 1-2 performing garbage collection using any of a number of P/E strategies, according to an embodiment of the inventive concept.
Figure 14B:
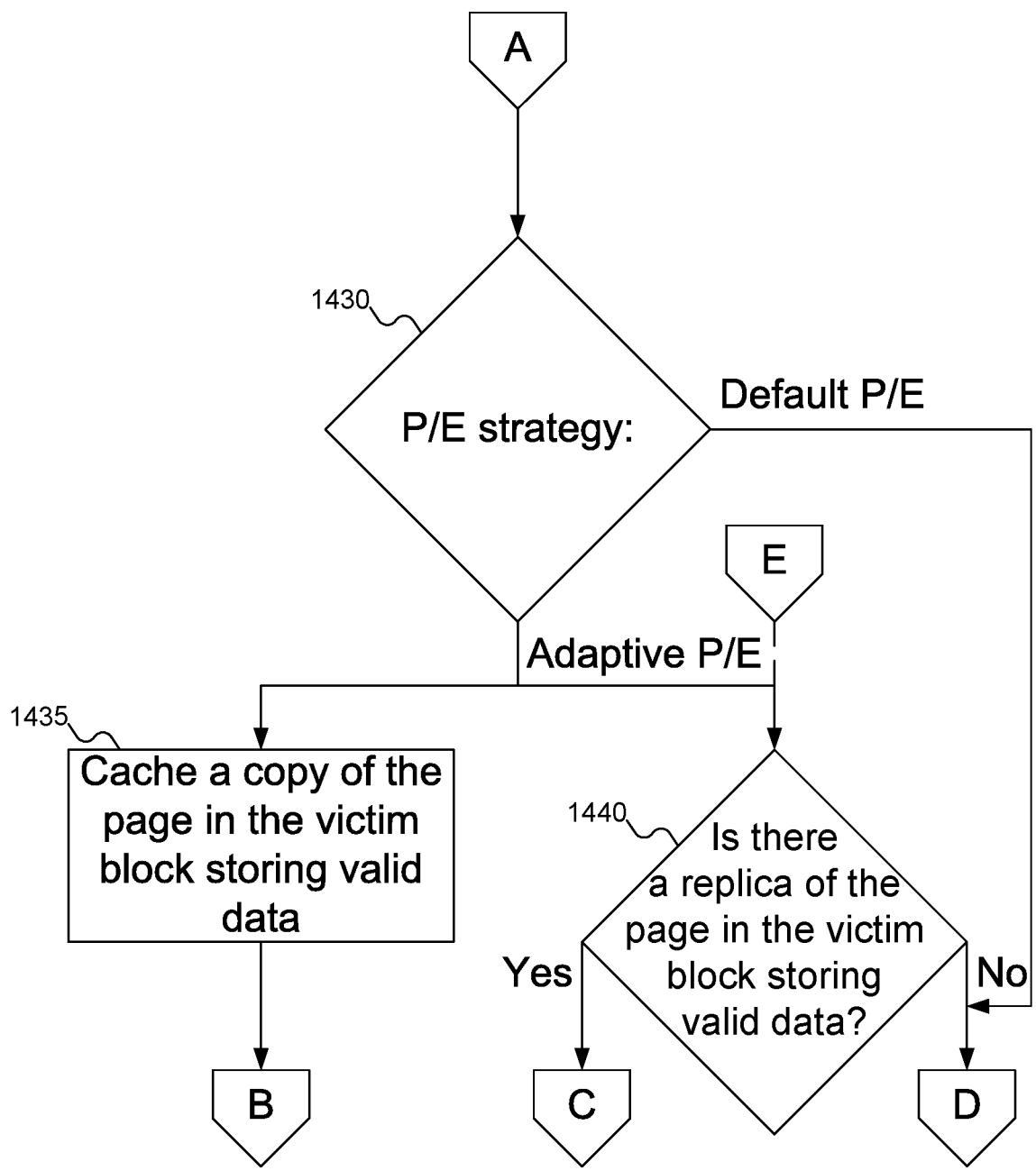
Figure 14C:
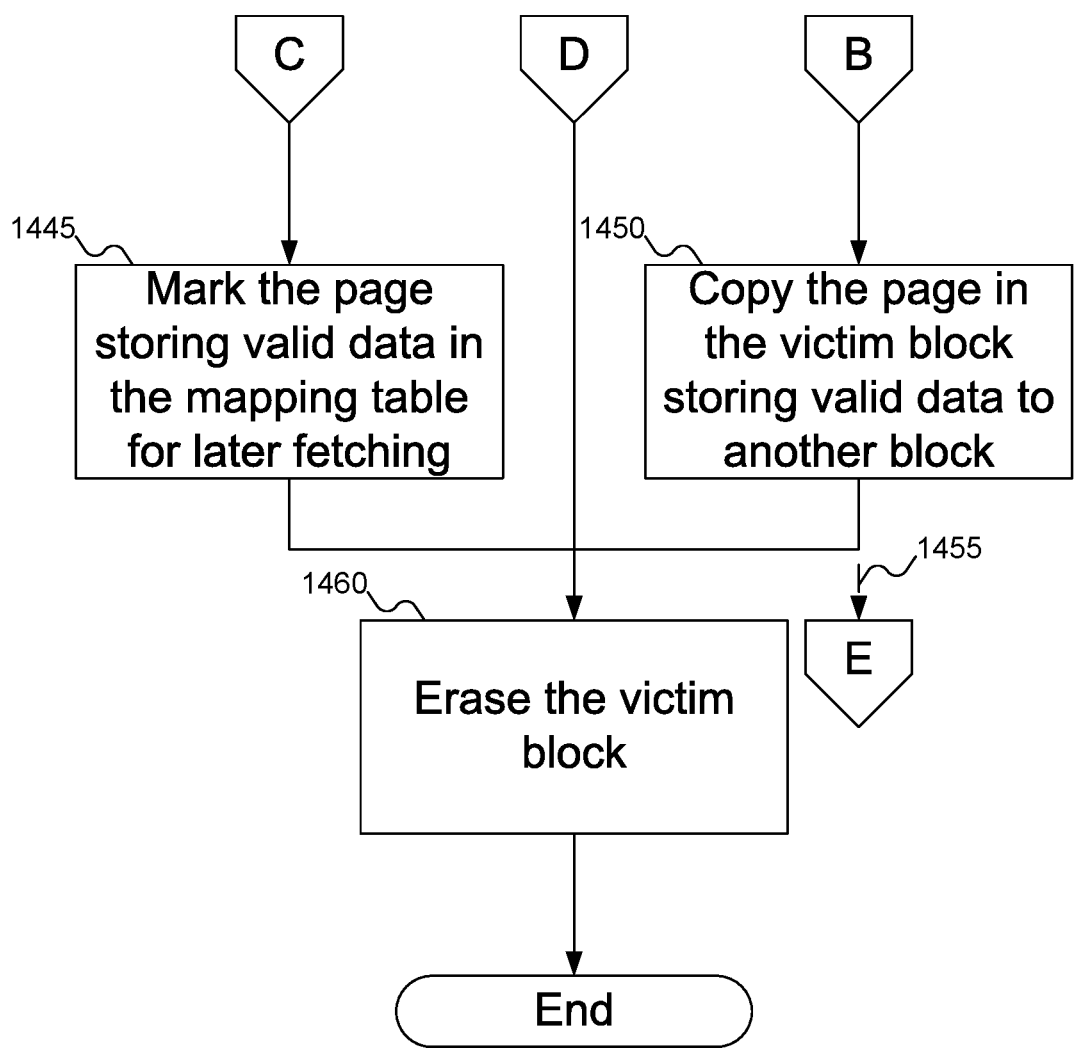

FIGS. 14A-14C show a flowchart of an example procedure for the SSD of FIGS. 1-2 performing garbage collection using any of a number of P/E strategies, according to an embodiment of the inventive concept. In FIG. 14A, at block 1405, reception circuitry 203 of FIG. 2 may receive a configuration instruction from host machine 105 of FIG. 2, not to perform garbage collection without an instruction from host machine 105 of FIG. 2 (using configuration logic 212 of FIG. 2). At block 1410, reception circuitry 203 of FIG. 2 may receive an instruction from host machine 105 of FIG. 2 to perform garbage collection. At block 1415, reception circuitry 203 of FIG. 2 may receive the selected P/E strategy from host machine 105 of FIG. 2. At block 1420, SSD controller 215 of FIG. 2 may identify victim blocks 233 and 236 of FIG. 2 to be erased. At block 1425, SSD controller 215 of FIG. 2 may identify valid pages 242, 269, and 245 of FIG. 2 in victim blocks 233 and 236 of FIG. 2.

At block 1430 (FIG. 14B), SSD controller 215 of FIG. 2 may determine which P/E strategy is to be used. If adaptive P/E strategy 1110 of FIG. 11 is to be used, then at block 1435, SSD controller 215 of FIG. 2 may cache a copy from victim blocks 233 and 236 of FIG. 2 in Dynamic RAM 224 of FIG. 2. Alternatively, at block 1440, SSD controller 215 of FIG. 2 may determine if other storage devices, such as storage device 115 of FIG. 1, store replicas of valid pages 242, 269, and 245 of FIG. 2 from victim blocks 233 and 236 of FIG. 2.

If other storage devices store replicas of valid pages 242, 269, and 245 of FIG. 2 from victim blocks 233 and 236 of FIG. 2, then at block 1445 (FIG. 14C) SSD controller 215 of FIG. 2 may mark those pages for later fetching in a delayed Program operation in mapping table 221 of FIG. 2. Otherwise, at block 1450, Program logic 227 of FIG. 2 may perform a Program operation on those valid pages from victim blocks 233 and 236 of FIG. 2 that lack replication. As shown by dashed line 1455, blocks 1440, 1445, and 1450 may be performed as many times as needed to inspect all valid pages in victim blocks 233 and 236 of FIG. 2.

On the other hand, if at block 1430 SSD controller 215 of FIG. 2 determines that the default P/E strategy is to be used, then processing may proceed to block 1450 to perform a Program operation on all valid pages in victim blocks 233 and 236 of FIG. 2, using Program logic 227 of FIG. 2.

Regardless of whether SSD controller 215 of FIG. 2 determines that default P/E strategy 1105 of FIG. 11 or adaptive P/E strategy 1110 of FIG. 11 is to be used, after any necessary Program operations are performed in block 1450, at block 1460 Erase logic 230 of FIG. 2 may Erase victim blocks 233 and 236 of FIG. 2, after which SSD 110 of FIG. 2 has completed garbage collection.

While FIGS. 14A-14C show an example flowchart, the order of the blocks shown in FIGS. 14A-14C may vary. For example, blocks 1405, 1410, and 1415 may occur in any order, or at the same time (or almost the same time). Similarly, blocks 1420, 1425, and 1430 may occur in any order, or at the same time (or almost the same time).

Figure 15A:
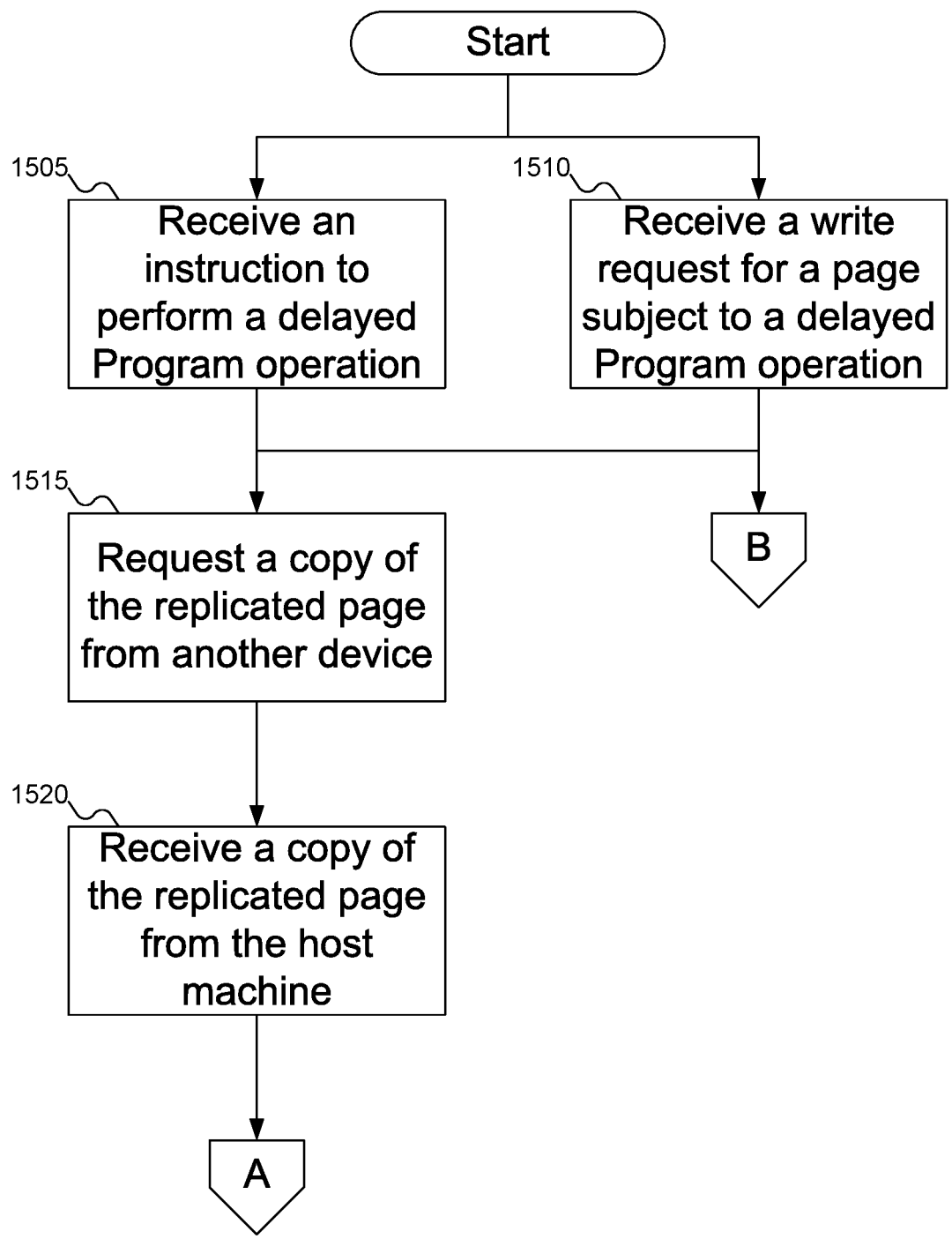
FIGS. 15A-15B show a flowchart of a procedure for the SSD of FIGS. 1-2 performing a delayed Program operation or a write request on data subject to a delayed Program operation, according to embodiments of the inventive concept.
Figure 15B:
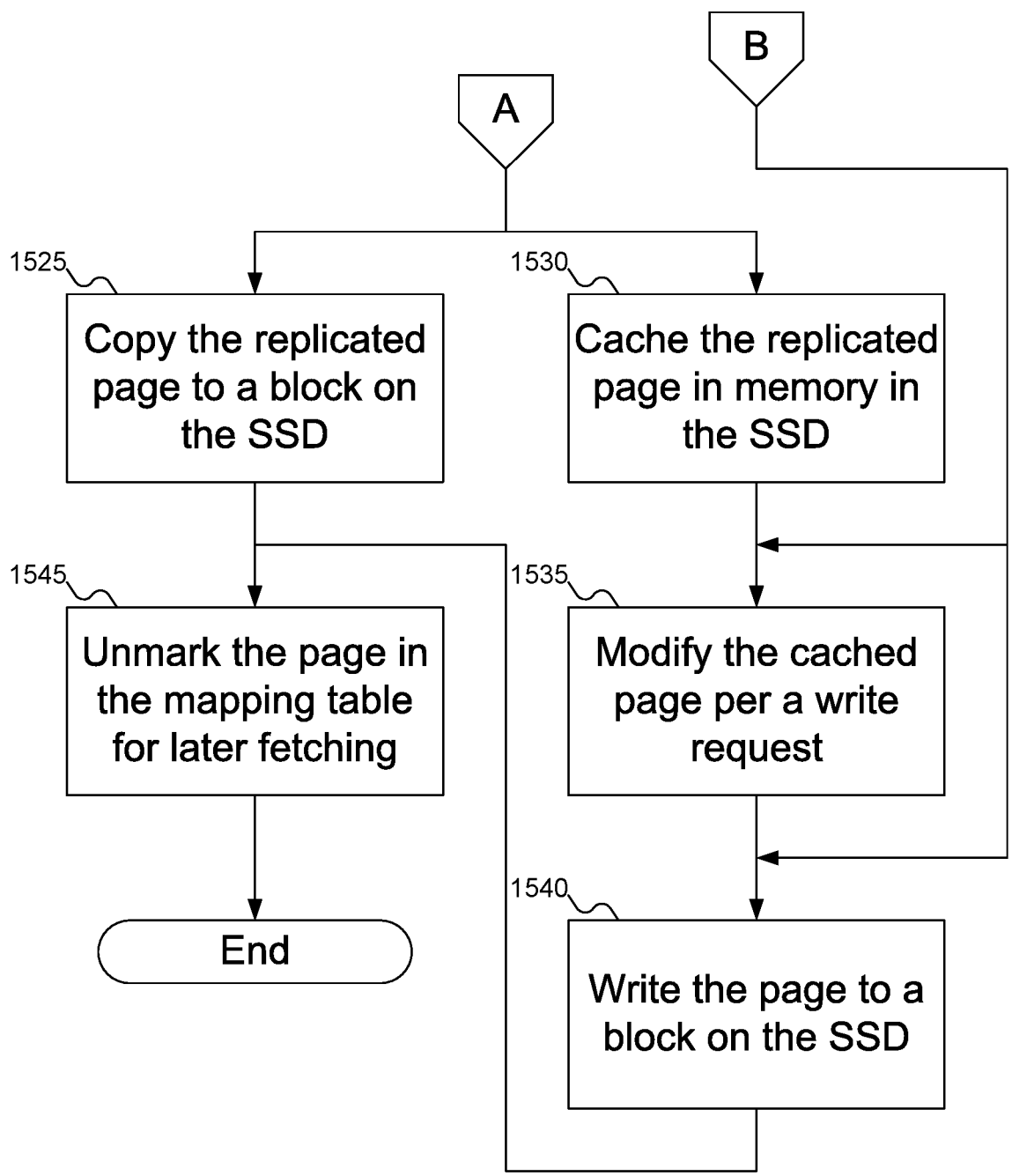

FIGS. 15A-15B show a flowchart of an example procedure for the SSD of FIGS. 1-2 performing a delayed Program operation or a write request on data subject to a delayed Program operation, according to embodiments of the inventive concept. In FIG. 15A, at block 1505, reception circuitry 203 of FIG. 2 may receive instruction 505 of FIG. 5 to perform a delayed Program operation. Alternatively, at block 1510, reception circuitry 203 of FIG. 2 may receive write instruction 605 of FIG. 6, affecting a page that was subject to a delayed Program operation. Since the procedures used are similar, examples of both procedures are shown in FIGS. 15A-15B.

Regardless of whether SSD 110 of FIG. 2 may be performing a delayed Program operation or performing write instruction 605 of FIG. 6 to modify a page that was subject to a delayed Program operation, SSD controller 215 of FIG. 2 may determine if the page in question is cached in Dynamic RAM 224 of FIG. 2. The page in question might be cached in Dynamic RAM 224 of FIG. 2 if, for example, SSD 110 of FIG. 2 cached the pages. If the page in question is not currently cached in Dynamic RAM 224 of FIG. 2, then at block 1515 transmission circuitry 206 of FIG. 2 may issue request 610 of FIG. 6, requesting copy 620 of FIG. 6 of the page from another storage device, such as storage device 115 of FIG. 1. At block 1520, reception circuitry 203 of FIG. 2 may receive copy 620 of FIG. 6 from host machine 105 of FIG. 2.

If SSD 110 of FIG. 2 was performing a delayed Program operation, then at block 1525 (FIG. 15B) SSD controller 215 of FIG. 2 may write copy 620 of FIG. 6 to a valid page, such as page 640 of FIG. 6, in block C (239 of FIG. 2).

If SSD 110 of FIG. 2 was processing a write request on data subject to a delayed Program operation, then at block 1530 SSD controller 215 of FIG. 2 may cache copy 620 of FIG. 6 in Dynamic RAM 224 of FIG. 2. At block 1535, SSD controller 215 of FIG. 2 may modify cached copy 620 of FIG. 6 as per write request 605 of FIG. 6, and at block 1540, SSD controller 215 of FIG. 2 may write modified cached copy 630 of FIG. 6 to page 640 of FIG. 6 in block C (239 of FIG. 2).

In either case, after the page has been written to flash memory 218 of FIG. 2, at block 1545, SSD controller 215 of FIG. 2 may unmark the page from mapping table 221 of FIG. 2 (since SSD 110 of FIG. 2 now stores a valid copy of the data).

If the page in question (to be Programmed after a delay or to be modified by write instruction 605 of FIG. 6) was previously cached in Dynamic RAM 224 of FIG. 2, then after receiving the appropriate instruction in blocks 1505 or 1510 of FIG. 15A, processing may jump directly to block 1535 (if the page in question is being modified by write instruction 605 of FIG. 6) or block 1540 (if the page in question is being Programmed after a delay). Block 1545 may also be skipped, if the page in question was not marked in mapping table 221 of FIG. 2).

Figure 16A:
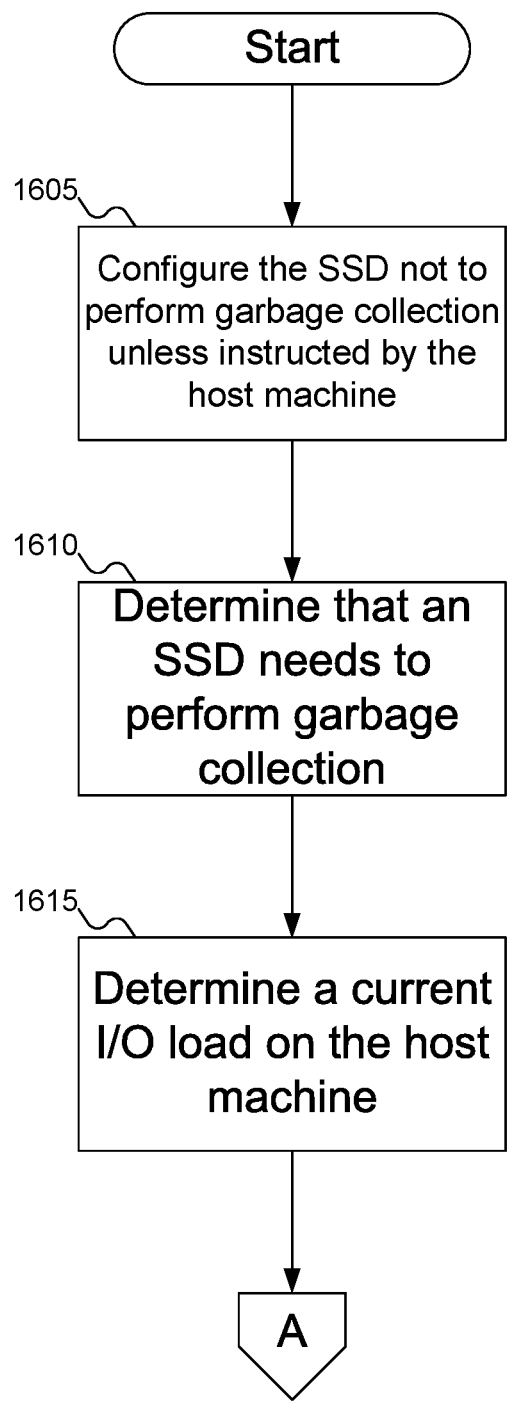
FIGS. 16A-16C show a flowchart of a procedure for the host machine of FIG. 1 to instruct the SSD of FIGS. 1-2 to perform garbage collection using any of a number of P/E strategies, according to embodiments of the inventive concept.
Figure 16B:
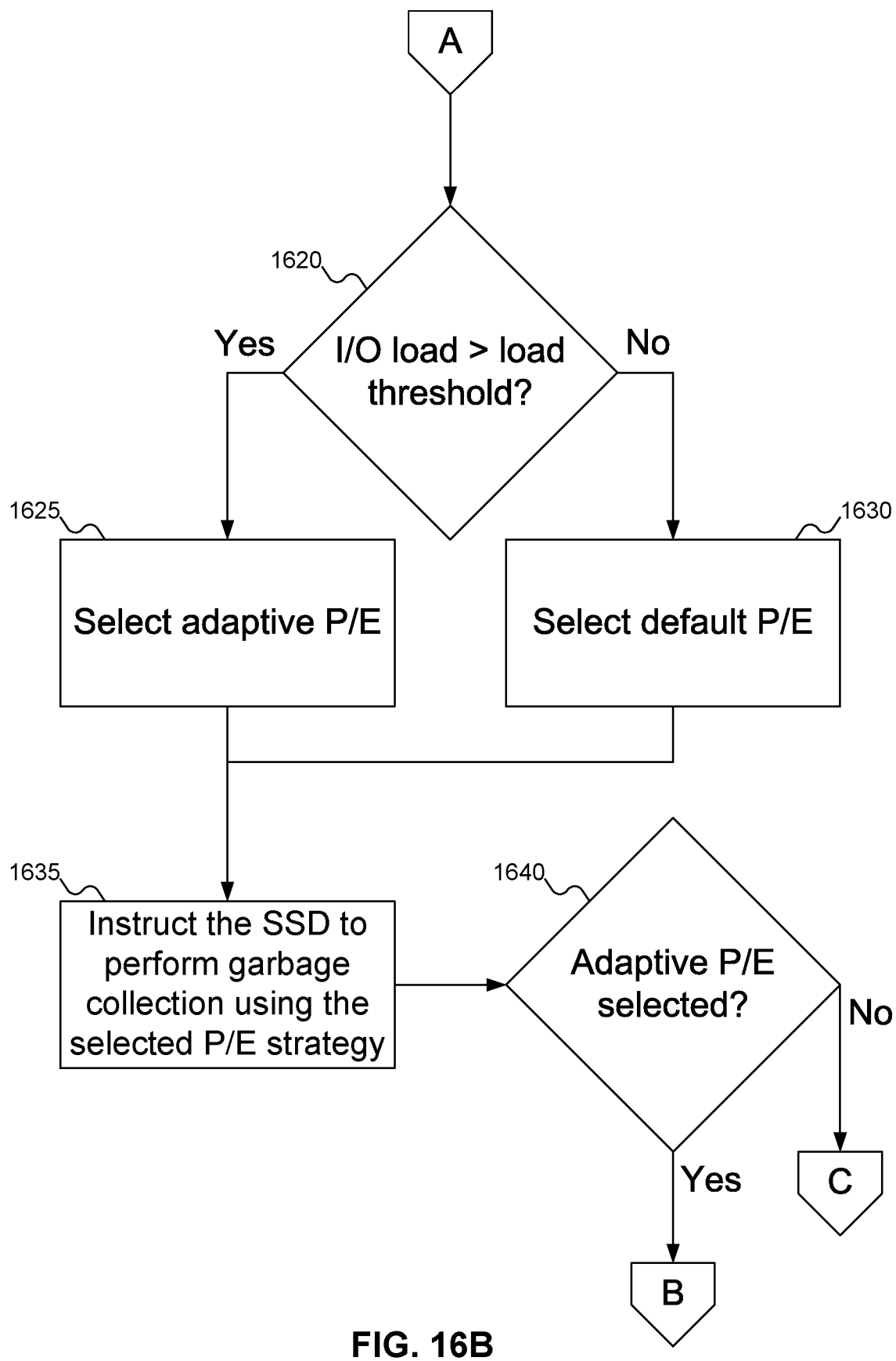
Figure 16C:
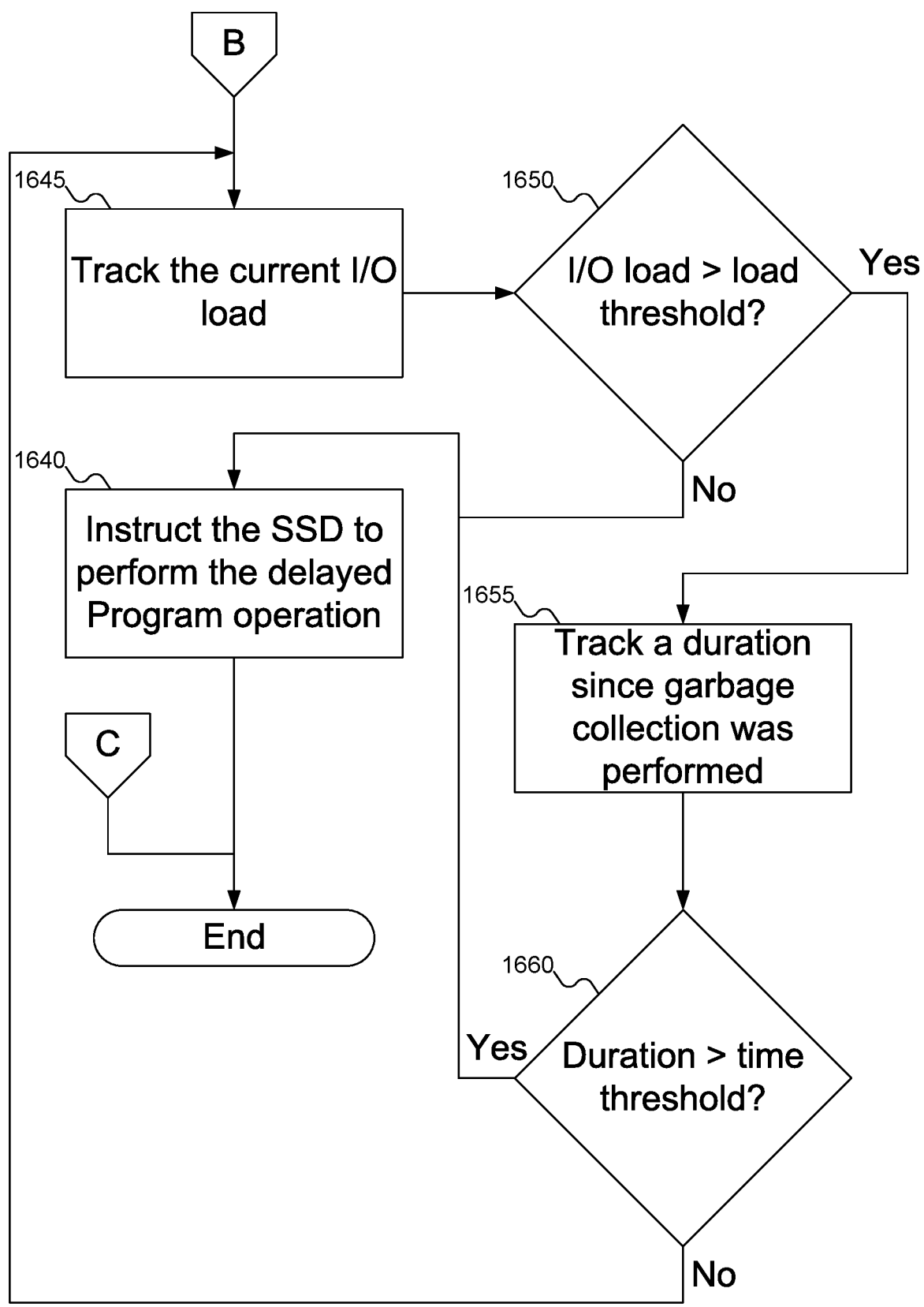

FIGS. 16A-16C show a flowchart of an example procedure for the host machine of FIG. 1 to instruct the SSD of FIGS. 1-2 to perform garbage collection, using any of a number of P/E strategies, according to embodiments of the inventive concept. In FIG. 16A, at block 1605, transmitter 915 of FIG. 9 may instruct SSD 110 of FIG. 2 not to perform garbage collection unless instructed to do so by host machine 105 of FIG. 2. At block 1610, host machine 105 of FIG. 2 may determine that SSD 110 of FIG. 2 needs to perform garbage collection. This may occur, for example, by receiver 920 of FIG. 9 receiving from SSD 110 of FIG. 2 a notification that SSD 110 of FIG. 2 needs to perform garbage collection. At block 1615, load monitor 930 of FIG. 9 may determine I/O load 1310 of FIG. 13.

At block 1620 (FIG. 16B), P/E strategy selector 935 of FIG. 9 may determine whether to use default P/E strategy 1105 of FIG. 11 or adaptive P/E strategy 1110 of FIG. 11. If P/E strategy selector 935 of FIG. 9 determines to use adaptive P/E strategy 1110 of FIG. 11, at block 1625 P/E strategy selector 935 of FIG. 9 may select adaptive P/E strategy 1110 of FIG. 11. Otherwise, at block 1630, P/E strategy selector 935 of FIG. 9 may select default P/E strategy 1105 of FIG. 11. Either way, at block 1635, transmitter 915 of FIG. 9 may instruct SSD 110 of FIG. 2 to perform garbage collection using the selected P/E strategy.

At block 1640, host machine 105 of FIG. 2 then determines what P/E strategy was selected. If P/E strategy selector 935 of FIG. 9 selected default P/E strategy 1105 of FIG. 11, nothing further needs to be done. But if P/E strategy selector 935 of FIG. 9 selected adaptive P/E strategy 1110 of FIG. 11, then at block 1645 (FIG. 16C), load monitor 930 may track I/O load 1310 over time. At block 1650, program instructor 940 of FIG. 9 may determine whether I/O load 1310 has dropped below load threshold 1120 of FIG. 12. If so, then at block 1640 program instructor 940 of FIG. 9 may instruct SSD 110 of FIG. 2 to perform a delayed Program operation. Otherwise, at block 1655 program instructor 940 of FIG. 9 may track how long duration 1320 of FIG. 13 has passed since SSD 110 of FIG. 2 completed the Erase operation of garbage collection. At block 1660, program instructor 940 of FIG. 9 may determine whether duration 1320 of FIG. 13 exceeds time threshold 1210 of FIG. 12. If so, then processing may continue at block 1640, where program instructor 940 of FIG. 9 may instruct SSD 110 of FIG. 2 to perform a delayed Program operation. Otherwise, control may return to block 1645 to continue checking to see when to instruct SSD 110 of FIG. 2 to perform a delayed Program operation.

While FIGS. 16A-16C show an example flowchart, the order of the blocks shown in FIGS. 16A-16C may vary. For example, blocks 1610 and 1615 may occur in any order, or at the same time (or almost the same time).

In FIGS. 14A-16C, some embodiment of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD) (110), comprising:
  storage (218) for data;
  reception circuitry (203) to receive an instruction (257) from a host machine (105) to perform garbage collection, the instruction (257) including a Program/Erase (P/E) strategy (260) to be used by the SSD (110);

garbage collection logic (209) to perform garbage collection responsive to the reception circuitry (203) receiving the instruction (257) to perform garbage collection, the garbage collection logic (209) including a Program logic (227) to perform a Program operation during garbage collection according to the P/E strategy (260); and a mapping table (221) to identify at least one page (242, 269, 245) in a victim block (233, 236) for later fetching from a replicated copy (130, 135, 140) on a second storage device (115);

wherein the Program logic (227) is operative to mark (248, 251, 254), in the mapping table (221), the at least one page (242, 269, 245) in a victim block (233, 236) on the SSD (110) for fetching from a replicated copy (130, 135, 140) from the second storage device (115) without copying the at least one page (242, 269, 245) to a second block (239) on the SSD (110) before erasing the victim block (233, 236) if the P/E strategy (260) is an adaptive P/E strategy (1110).

Statement 2. An embodiment of the inventive concept includes an SSD (110) according to statement 1, wherein responsive to the reception circuitry (203) receiving a write request (605) from a client machine (150), the Program logic (227) is operative to cache (620) the replicated copy (130, 135, 140) of the at least one page (242, 269, 245) from the second storage device (115) to a memory (224) on the SSD (110), to modify (625) the cached copy (650) of the at least one page (242, 269, 245) in the memory (224) responsive to the write request (605), and to write (635) the modified copy (630) of the at least one page (242, 269, 245) to the second block (239) on the SSD (110).

Statement 3. An embodiment of the inventive concept includes an SSD (110) according to statement 2, wherein the Program logic (227) is operative to unmark (645) the at least one page (242, 269, 245) in the mapping table (221).

Statement 4. An embodiment of the inventive concept includes an SSD (110) according to statement 1, wherein the Program logic (227) is operative to copy the at least one page (242, 269, 245) from the victim block (233, 236) to the second block (239) on the SSD (110) before erasing the victim block (233, 236) if the P/E strategy (260) is a default P/E strategy (260).

Statement 5. An embodiment of the inventive concept includes an SSD (110) according to statement 1, wherein, if the P/E strategy (260) is the adaptive P/E strategy (1110), the Program logic (227) is operative to copy (515) the replicated copy (130, 135, 140) of the at least one page (242, 269, 245) from the second storage device (115) to the second block (239) on the SSD (110) when an I/O load (1310) on the host machine (105) is below a load threshold (1120).

Statement 6. An embodiment of the inventive concept includes an SSD (110) according to statement 1, wherein, if the P/E strategy (260) is an adaptive P/E strategy (1110), the Program logic (227) is operative to copy (515) the replicated copy (130, 135, 140) of the at least one page (242, 269, 245) from the second storage device (115) to the second block (239) on the SSD (110) after a time threshold (1210) has passed.

Statement 7. An embodiment of the inventive concept includes an SSD (110) according to statement 1, wherein the Program logic (227) is operative to copy the at least one page (242, 269, 245) from the victim block (233, 236) to the second block (239) on the SSD (110) before erasing the victim block (233, 236) despite the P/E strategy (260) being an adaptive P/E strategy (1110) if no replicated copy (130, 135, 140) of the at least one page (242, 269, 245) exists on the second storage device (115).

Statement 8. An embodiment of the inventive concept includes an SSD (110) according to statement 1, wherein the SSD (110) further includes configuration logic (212) to configure the SSD (110) not to perform garbage collection unless instructed by the host machine (105).

Statement 9. An embodiment of the inventive concept includes a Solid State Drive (SSD) (110), comprising:

storage (218) for data;

reception circuitry (203) to receive an instruction (257) from a host machine (105) to perform garbage collection, the instruction (257) including a Program/Erase (P/E) strategy (260) to be used by the SSD (110);

garbage collection logic (209) to perform garbage collection responsive to the reception circuitry (203) receiving the instruction (257) to perform garbage collection, the garbage collection logic (209) including a Program logic (227) to perform a Program operation during garbage collection according to the P/E strategy (260);

Dynamic Random Access Memory (RAM) (224) to cache a copy of the at least one page (242, 269, 245) in the victim block (233, 236) on the SSD (110); and a SSD controller (215) operative to copy the at least one page (242, 269, 245) from the victim block 233, 236) to a cached copy (710, 715, 725) in the Dynamic RAM (224) before erasing the victim block (233, 236) and to copy the cached copy (710, 715, 725) to the second block (239) after erasing the victim block (233, 236) without copying the at least one page (242, 269, 245) to a second block (239) on the SSD (110) before erasing the victim block (233, 236) if the P/E strategy (260) is an adaptive P/E strategy (1110).

Statement 10. An embodiment of the inventive concept includes an SSD (110) according to statement 9, wherein the Program logic (227) is operative to copy the at least one page (242, 269, 245) from the victim block (233, 236) to the second block (239) on the SSD (110) before erasing the victim block (233, 236) if the P/E strategy (260) is a default P/E strategy (260).

Statement 11. An embodiment of the inventive concept includes an SSD (110) according to statement 9, wherein, if the P/E strategy (260) is the adaptive P/E strategy (1110), the Program logic (227) is operative to copy (515) the cached copy (710, 715, 725) of the at least one page (242, 269, 245) from the Dynamic RAM (224) to the second block (239) on the SSD (110) when an I/O load (1310) on the host machine (105) is below a load threshold (1120).

Statement 12. An embodiment of the inventive concept includes an SSD (110) according to statement 9, wherein, if the P/E strategy (260) is an adaptive P/E strategy (1110), the Program logic (227) is operative to copy (515) the cached copy (710, 715, 725) of the at least one page (242, 269, 245) from the Dynamic RAM (224) to the second block (239) on the SSD (110) after a time threshold (1210) has passed.

Statement 13. An embodiment of the inventive concept includes an SSD (110) according to statement 9, wherein the Program logic (227) is operative to copy the at least one page (242, 269, 245) from the victim block (233, 236) to the second block (239) on the SSD (110) before erasing the victim block (233, 236) despite the P/E strategy (260) being an adaptive P/E strategy (1110) if no replicated copy (130, 135, 140) of the at least one page (242, 269, 245) exists on a second storage device (115).

Statement 14. An embodiment of the inventive concept includes an SSD (110) according to statement 9, wherein the SSD (110) further includes configuration logic (212) to configure the SSD (110) not to perform garbage collection unless instructed by the host machine (105).

Statement 15. An embodiment of the inventive concept includes a Solid State Drive (SSD) (110), comprising:

storage (218) for data;

reception circuitry (203) to receive an instruction (257) from a host machine (105) to perform garbage collection, the instruction (257) including a Program/Erase (P/E) strategy (260) to be used by the SSD (110);

garbage collection logic (209) to perform garbage collection responsive to the reception circuitry (203) receiving the instruction (257) to perform garbage collection, the garbage collection logic (209) including a Program logic (227) to perform a Program operation during garbage collection according to the P/E strategy (260); and means for performing (203, 206, 224) a delayed Program operation for at least one page (242, 269, 245) in a victim block (233, 236) without copying the at least one page (242, 269, 245) to a second block (239) on the SSD (110) before erasing the victim block (233, 236) if the P/E strategy (260) is an adaptive P/E strategy (1110).

Statement 16. An embodiment of the inventive concept includes an SSD (110) according to statement 15, wherein the means for performing (203, 206, 224) a delayed Program operation includes:

a mapping table (221) to identify at least one page (242, 269, 245) in a victim block (233, 236) for later fetching from a replicated copy (130, 135, 140) on a second storage device (115);

wherein the Program logic (227) is operative to mark (248, 251, 254), in the mapping table (221), the at least one page (242, 269, 245) in a victim block (233, 236) on the SSD (110) for fetching from a replicated copy (130, 135, 140) from the second storage device (115).

Statement 17. An embodiment of the inventive concept includes an SSD (110) according to statement 16, wherein responsive to the reception circuitry (203) receiving a write request (605) from a client machine (150), the Program logic (227) is operative to cache (620) the replicated copy (130, 135, 140) of the at least one page (242, 269, 245) from the second storage device (115) to a memory (224) on the SSD (110), to modify (625) the cached copy (650) of the at least one page (242, 269, 245) in the memory (224) responsive to the write request (605), and to write (635) the modified copy (630) of the at least one page (242, 269, 245) to the second block (239) on the SSD (110).

Statement 18. An embodiment of the inventive concept includes an SSD (110) according to statement 17, wherein the Program logic (227) is operative to unmark (645) the at least one page (242, 269, 245) in the mapping table (221).

Statement 19. An embodiment of the inventive concept includes an SSD (110) according to statement 15, wherein:

the means for performing (203, 206, 224) a delayed Program operation includes Dynamic Random Access Memory (RAM) (224) to cache a copy of the at least one page (242, 269, 245) in the victim block (233, 236) on the SSD (110); and the SSD controller (215) is operative to copy the at least one page (242, 269, 245) from the victim block 233, 236) to a cached copy (710, 715, 725) in the Dynamic RAM (224) before erasing the victim block (233, 236) and to copy the cached copy (710, 715, 725) to the second block (239) after erasing the victim block (233, 236).

Statement 20. An embodiment of the inventive concept includes an SSD (110) according to statement 15, wherein the Program logic (227) is operative to copy the at least one page (242, 269, 245) from the victim block (233, 236) to the second block (239) on the SSD (110) before erasing the victim block (233, 236) if the P/E strategy (260) is a default P/E strategy (260).

Statement 21. An embodiment of the inventive concept includes an SSD (110) according to statement 15, wherein, if the P/E strategy (260) is the adaptive P/E strategy (1110), the Program logic (227) is operative to copy (515) the replicated copy (130, 135, 140) of the at least one page (242, 269, 245) from a second storage device (115) to the second block (239) on the SSD (110) when an I/O load (1310) on the host machine (105) is below a load threshold (1120).

Statement 22. An embodiment of the inventive concept includes an SSD (110) according to statement 15, wherein, if the P/E strategy (260) is an adaptive P/E strategy (1110), the Program logic (227) is operative to copy (515) the replicated copy (130, 135, 140) of the at least one page (242, 269, 245) from a second storage device (115) to the second block (239) on the SSD (110) after a time threshold (1210) has passed.

Statement 23. An embodiment of the inventive concept includes an SSD (110) according to statement 15, wherein the Program logic (227) is operative to copy the at least one page (242, 269, 245) from the victim block (233, 236) to the second block (239) on the SSD (110) before erasing the victim block (233, 236) despite the P/E strategy (260) being an adaptive P/E strategy (1110) if no replicated copy (130, 135, 140) of the at least one page (242, 269, 245) exists on a second storage device (115).

Statement 24. An embodiment of the inventive concept includes an SSD (110) according to statement 15, wherein the SSD (110) further includes configuration logic (212) to configure the SSD (110) not to perform garbage collection unless instructed by the host machine (105).

Statement 25. An embodiment of the inventive concept includes a host machine (105), comprising:

a processor (905);

a network connector (925) operative to connect the host machine (105) to a network (145);

a load monitor (930) operative to monitor an input/output (I/O) load (1310) on at least one SSD (110, 115);

a Program/Erase (P/E) strategy selector (935) operative to select among at least a default P/E strategy (260) and an adaptive P/E strategy (1110) based on the I/O load (1310); and a transmitter (915) operative to transmit a garbage collection instruction (257) to the at least one SSD (110, 115) with the selected P/E strategy (260).

Statement 26. An embodiment of the inventive concept includes a host machine (105) according to statement 25, further comprising the at least one Solid State Drive (SSD) (110, 115) on the host machine (105).

Statement 27. An embodiment of the inventive concept includes a host machine (105) according to statement 25, wherein the load monitor (930) is operative to periodically determine the I/O load (1310) on the at least one SSD (110, 115).

Statement 28. An embodiment of the inventive concept includes a host machine (105) according to statement 25, wherein the load monitor (930) is operative to determine the I/O load (1310) when the at least one SSD (110, 115) needs to perform garbage collection.

Statement 29. An embodiment of the inventive concept includes a host machine (105) according to statement 25, wherein the P/E strategy selector (935) includes a comparator (1115) to compare the I/O load (1310) with a load threshold (1120).

Statement 30. An embodiment of the inventive concept includes a host machine (105) according to statement 29, wherein the P/E strategy selector (935) is operative to select the default P/E strategy (260) when the I/O load (1310) is less than the load threshold (1120).

Statement 31. An embodiment of the inventive concept includes a host machine (105) according to statement 29, wherein the P/E strategy selector (935) is operative to select an adaptive P/E strategy (1110) when the I/O load (1310) is greater than the load threshold (1120).

Statement 32. An embodiment of the inventive concept includes a host machine (105) according to statement 25, wherein:

the host machine (105) further comprises a Program instructor (940) operative to determine when to instruct the at least one SSD (110, 115) to perform a delayed Program operation; and the transmitter (915) is operative to transmit an instruction (505) to perform the delayed Program operation to the at least one SSD (110, 115).

Statement 33. An embodiment of the inventive concept includes a host machine (105) according to statement 32, wherein:

the Program instructor (940) includes a comparator (1205) to compare the I/O load (1310) with a load threshold (1120); and the Program instructor (940) is operative to instruct the at least one SSD (110, 115) to perform the delayed Program operation if the I/O load (1310) is less than the load threshold (1120).

Statement 34. An embodiment of the inventive concept includes a host machine (105) according to statement 32, wherein:

the Program instructor (940) includes a timer to measure a duration (1320) since the P/E strategy selector (935) selected an adaptive P/E strategy (1110); and the Program instructor (940) is operative to instruct the at least one SSD (110, 115) to perform the delayed Program operation if the duration (1320) is greater than a time threshold (1210).

Statement 35. An embodiment of the inventive concept includes a host machine (105) according to statement 25, wherein the load monitor (930) and the P/E strategy selector (935) may be executed by the processor (905).

Statement 36. An embodiment of the inventive concept includes a host machine (105) according to statement 25, wherein the load monitor (930) and the P/E strategy selector (935) are hardware modules in the host machine (105).

Statement 37. An embodiment of the inventive concept includes a host machine (105) according to statement 25, further comprising a configuration logic (945) operative to configure the at least one SSD (110, 115) to perform garbage collection only when instructed by the host machine (105).

Statement 38. An embodiment of the inventive concept includes a method, comprising:

receiving (1410, 1415), from a host machine (105) at a Solid State Drive (SSD) (110), an instruction (257) to perform garbage collection, the instruction (257) including a Program/Erase (P/E) strategy (260) to be used by the SSD (110);

identifying (1420) a victim block (233, 236) on the SSD (110) to be erased;

identifying (1425) at least one page (242, 269, 245) in the victim block (233, 236) that stores valid data;

if the P/E strategy (260) specifies to use adaptive P/E, arranging (1435, 1445), to copy the at least one page (242, 269, 245) to a second block (239) on the SSD (110) after erasing (1460) the victim block (233, 236); and erasing (1460) the victim block (233, 236).

Statement 39. An embodiment of the inventive concept includes a method according to statement 38, wherein arranging (1445), to copy the at least one page (242, 269, 245) to a second block (239) on the SSD (110) after erasing (1460) the victim block (233, 236) includes marking (1445), in a mapping table (221), the at least one page (242, 269, 245) for fetching from a replicated copy (130, 135, 140) on a second storage device (115) without copying the at least one page (242, 269, 245) to a second block (239) on the SSD (110).

Statement 40. An embodiment of the inventive concept includes a method according to statement 39, wherein marking (1445) the at least one page (242, 269, 245) for fetching from a replicated copy (130, 135, 140) includes copying (1450) the at least one page (242, 269, 245) to the second block (239) on the SSD (110) before erasing the victim block (233, 236) if no replicated copy (130, 135, 140) of the at least one page (242, 269, 245) exists on the second storage device (115).

Statement 41. An embodiment of the inventive concept includes a method according to statement 38, wherein arranging (1445), to copy the at least one page (242, 269, 245) to a second block (239) on the SSD (110) after erasing (1460) the victim block (233, 236) includes caching (1435) a copy (710, 715, 725) of the at least one page (242, 269, 245) in a Dynamic Random Access Memory (RAM) (224) before erasing (1460) the victim block (233, 236).

Statement 42. An embodiment of the inventive concept includes a method according to statement 41, wherein arranging (1445), to copy the at least one page (242, 269, 245) to a second block (239) on the SSD (110) after erasing (1460) the victim block (233, 236) further includes writing (1540) the cached copy (710, 715, 725) to the second block (239) after erasing (1460) the victim block (233, 236).

Statement 43. An embodiment of the inventive concept includes a method according to statement 38, further comprising, if the P/E strategy (260) specifies to use default P/E, copying (1450) the at least one page (242, 269, 245) to the second block (239) on the SSD (110) before erasing the victim block (233, 236).

Statement 44. An embodiment of the inventive concept includes a method according to statement 38, further comprising, when an input/output (I/O) load (1310) for the SSD (110) is low, copying (1520) the replicated copy (130, 135, 140) of the at least one page (242, 269, 245) from the second storage device (115) to the second block (239) on the SSD (110).

Statement 45. An embodiment of the inventive concept includes a method according to statement 38, further comprising, after a time threshold (1210) has passed, copying (1520) the replicated copy (130, 135, 140) of the at least one page (242, 269, 245) from the second storage device (115) to the second block (239) on the SSD (110).

Statement 46. An embodiment of the inventive concept includes a method according to statement 38, further comprising:

receiving (1510) a write request (605) to the at least one page (242, 269, 245);

modifying (1535) a cached copy (650) of the at least one page (242, 269, 245) on the SSD (110) according to the write request (605); and writing (1540) the modified copy (630) of the at least one page (242, 269, 245) to the second block (239) on the SSD (110).

Statement 47. An embodiment of the inventive concept includes a method according to statement 46, further comprising caching (1530) the replicated copy (130, 135, 140) of the at least one page (242, 269, 245) from the second storage device (115) to memory (224) on the SSD (110).

Statement 48. An embodiment of the inventive concept includes a method according to statement 46, further comprising unmarking (1545) the at least one page (242, 269, 245) for later fetching from the replicated copy (130, 135, 140).

Statement 49. An embodiment of the inventive concept includes a method according to statement 38, further comprising configuring (1405) the SSD (110) not to perform garbage collection unless instructed by the host machine (105).

Statement 50. An embodiment of the inventive concept includes a method, comprising: determining (1610) that a Solid State Drive (SSD) (110) in communication with a host machine (105) needs to perform garbage collection;
determining (1615) a current input/output (I/O) load (1310) at the host machine (105);
selecting (1625, 1630) from at least a default Program/Erase (P/E) strategy (260) and an adaptive P/E strategy (1110) based on the current I/O load (1310) at the host machine (105); and
instructing (1635) the SSD (110) to perform garbage collection using the selected P/E strategy (260).

Statement 51. An embodiment of the inventive concept includes a method according to statement 50, wherein selecting (1625, 1630) from at least a default P/E strategy (260) and an adaptive P/E strategy (1110) includes:
comparing (1620) the current I/O load (1310) with a load threshold (1120);
if the current I/O load (1310) is less than the load threshold (1120), selecting (1630) the default P/E strategy (260); and
if the current I/O load (1310) is greater than the load threshold (1120), selecting (1625) the adaptive P/E strategy (1110).

Statement 52. An embodiment of the inventive concept includes a method according to statement 50, further comprising, if the selected P/E strategy (260) was the adaptive P/E strategy (1110):
tracking (1645) the current I/O load (1310); and
if the current I/O load (1310) drops below the load threshold (1120), instructing (1640) the SSD (110) to perform a delayed Program operation.

Statement 53. An embodiment of the inventive concept includes a method according to statement 50, further comprising, if the selected P/E strategy (260) was the adaptive P/E strategy (1110):
tracking (1655) a duration (1320) since the SSD (110) performed garbage collection; and
if the duration (1320) exceeds a time threshold (1210), instructing (1640) the SSD (110) to perform a delayed Program operation.

Statement 54. An embodiment of the inventive concept includes a method according to statement 50, further comprising configuring (1605) the SSD (110) not to perform garbage collection unless instructed by the host machine (105).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising: storage for data; reception circuitry to receive an instruction from a host machine to perform garbage collection, the instruction including a Program/Erase (P/E) strategy to be used by the SSD, the P/E strategy to be used by the SSD being one of at least a default P/E strategy and an adaptive P/E strategy; garbage collection logic to perform garbage collection responsive to the reception circuitry receiving the instruction to perform garbage collection, the garbage collection logic including a Program logic to perform a Program operation during garbage collection according to the P/E strategy, the garbage collection logic implementing at least the default P/E strategy and the adaptive P/E strategy; and a mapping table to identify at least one page in a victim block for later fetching from a replicated copy on a second storage device; wherein based at least in part on the instruction including the adaptive P/E strategy, the Program logic is operative to mark, in the mapping table, the at least one page in a victim block on the SSD for fetching from a replicated copy from the second storage device without copying the at least one page to a second block on the SSD before erasing the victim block.

2. An SSD according to claim 1, wherein responsive to the reception circuitry receiving a write request from a client machine, the Program logic is operative to cache the replicated copy of the at least one page from the second storage device to a memory on the SSD, to modify the cached copy of the at least one page in the memory responsive to the write request, and to write the modified copy of the at least one page to the second block on the SSD.

3. An SSD according to claim 1, wherein based at least in part on the adaptive P/E strategy being used, the Program logic is operative to copy the replicated copy of the at least one page from the second storage device to the second block on the SSD when an I/0 load on the host machine is below a load threshold.

4. An SSD according to claim 1, wherein based at least in part on the adaptive P/E strategy being used, the Program logic is operative to copy the replicated copy of the at least one page from the second storage device to the second block on the SSD after a time threshold has passed.

5. An SSD according to claim 1, wherein based at least in part on no replicated copy of the at least one page exists on the second storage device, the Program logic is operative to copy the at least one page from the victim block to the second block on the SSD before erasing the victim block despite the P/E strategy being the adaptive P/E strategy.

6. A Solid State Drive (SSD), comprising: storage for data; reception circuitry to receive an instruction from a host machine to perform garbage collection, the instruction including a Program/Erase (P/E) strategy to be used by the SSD, the P/E strategy to be used by the SSD being one of at least a default P/E strategy and an adaptive P/E strategy; garbage collection logic to perform garbage collection responsive to the reception circuitry receiving the instruction to perform garbage collection, the garbage collection logic including a Program logic to perform a Program operation during garbage collection according to the P/E strategy, the garbage collection logic implementing at least the default P/E strategy and the adaptive P/E strategy; Dynamic Random Access Memory (RAM) to cache a copy of the at least one page in the victim block on the SSD; and a SSD controller operative that, based at least in part on the instruction including the adaptive P/E strategy-being-used, is operative to copy the at least one page from the victim block to a cached copy in the Dynamic RAM before erasing the victim block and to copy the cached copy to the second block after erasing the victim block without copying the at least one page to a second block on the SSD before erasing the victim block.

7. An SSD according to claim 6, wherein based at least in part on the adaptive P/E strategy being used, the Program logic is operative to copy the cached copy of the at least one page from the Dynamic RAM to the second block on the SSD when an 1/0 load on the host machine is below a load threshold.

8. An SSD according to claim 6, wherein based at least in part on the adaptive P/E strategy being used, the Program logic is operative to copy the cached copy of the at least one page from the Dynamic RAM to the second block on the SSD after a time threshold has passed.

9. An SSD according to claim 6, wherein based at least in part on no replicated copy of the at least one page exists on a second storage device, the Program logic is operative to copy the at least one page from the victim block to the second block on the SSD before erasing the victim block despite the P/E strategy being the adaptive P/E strategy.

\* \* \* \* \*